(12) United States Patent
Materna

(10) Patent No.: US 6,601,460 B1
(45) Date of Patent: Aug. 5, 2003

(54) FLOWMETER BASED ON PRESSURE DROP ACROSS PARALLEL GEOMETRY USING BOUNDARY LAYER FLOW INCLUDING REYNOLDS NUMBERS ABOVE THE LAMINAR RANGE

(76) Inventor: Peter Albert Materna, 81 Rector St., Metuchen, NJ (US) 08840-1540

( * ) Notice: Subject to any disclaimer, the term of this patent is extended or adjusted under 35 U.S.C. 154(b) by 0 days.

(21) Appl. No.: 09/328,730

(22) Filed: Jun. 9, 1999

Related U.S. Application Data

(60) Provisional application No. 60/088,726, filed on Jun. 10, 1998.

(51) Int. Cl.$^7$ ............................................. G01F 1/37
(52) U.S. Cl. .................................................. 73/861.52
(58) Field of Search ........................ 73/861.52, 861.42, 73/861.65, 861

(56) References Cited

U.S. PATENT DOCUMENTS

| | | | |
|---|---|---|---|
| 3,838,598 A | | 10/1974 | Tompkins |
| 4,118,973 A | * | 10/1978 | Tucker et al. ............... 73/54.04 |
| 4,450,718 A | | 5/1984 | Hartemink |
| 5,249,462 A | * | 10/1993 | Bonne ...................... 73/204.21 |
| 5,297,427 A | | 3/1994 | Shambayati |
| 5,357,793 A | | 10/1994 | Jouwsma |
| 5,511,416 A | | 4/1996 | Shambayati |
| 5,576,498 A | | 11/1996 | Shambayati |
| 5,763,791 A | | 6/1998 | Shambayati |
| 5,837,903 A | * | 11/1998 | Weigand ...................... 702/47 |

OTHER PUBLICATIONS

Gauge and Differential Pressure Transducers with Monolithic Integrated Piezoresistive Sensor for an Extensive Temperature Range, Beshliu, et al., 1996, IEEE, pp. 105–108.*

Jack Wiegand, Gas Flow Measurement Using Laminar Flow Elements, OR–94–15–1.
Sales literature from Meriam Instruments (12/89).
Sales literature from Hexcel (1995,1994,1992).
Frank White, Fluid Mechanics, 1979, pp. 305–447 McGraw–Hill Inc., USA.
Hermann Schlichting, Boundary Layer Theory, 1955, pp. 94–113; 1979, p. 186, Pergamon Press, London.
T. V. Nguyen, Low Reynolds number simultaneously developing flows in the entrance region of parallel plates, Int. J. Heat Mass Transfer, vol. 34, No. 4/5, pp. 1219–1225, 1991, Pergamon Press, Great Britain.
Y. Nishimura, Y. Ohyama, H. Kuroiwa, T. Sasayama, S. Ueno, T. Ohtani, Hot Wire Air Flow Meter for Engine Control Testing (no further information).
Description of a device which the applicant has seen (no further information).
Richard Miller, Flow Measurement Engineering Handbook, 1996, pp. 1.1–1.5, 6.1–15.50, McGraw–Hill, USA.

* cited by examiner

*Primary Examiner*—Hezron Williams
*Assistant Examiner*—Corey D. Mack
(74) *Attorney, Agent, or Firm*—Peter Materna

(57) ABSTRACT

A flowmeter based on the pressure difference across a flow resistance element which is an array of surfaces generally parallel to the flow direction, which is operated such that over at least part of its range the Reynolds number is larger than the traditional limiting Reynolds number for laminar flow of approximately 2000. Also, the L/D ratio is shorter than in a traditional laminar flow element, so that for at least part of its range its operation is determined by the behavior of boundary layers forming on those surfaces. Such a flow resistance element provides a pressure drop vs. flowrate relationship which over a wide range of flow conditions is less steep than quadratic. This allows a larger flowrate turndown ratio for a given range of differential pressure measurement. The flowmeter may additionally comprise other sensors and a microprocessor.

25 Claims, 16 Drawing Sheets

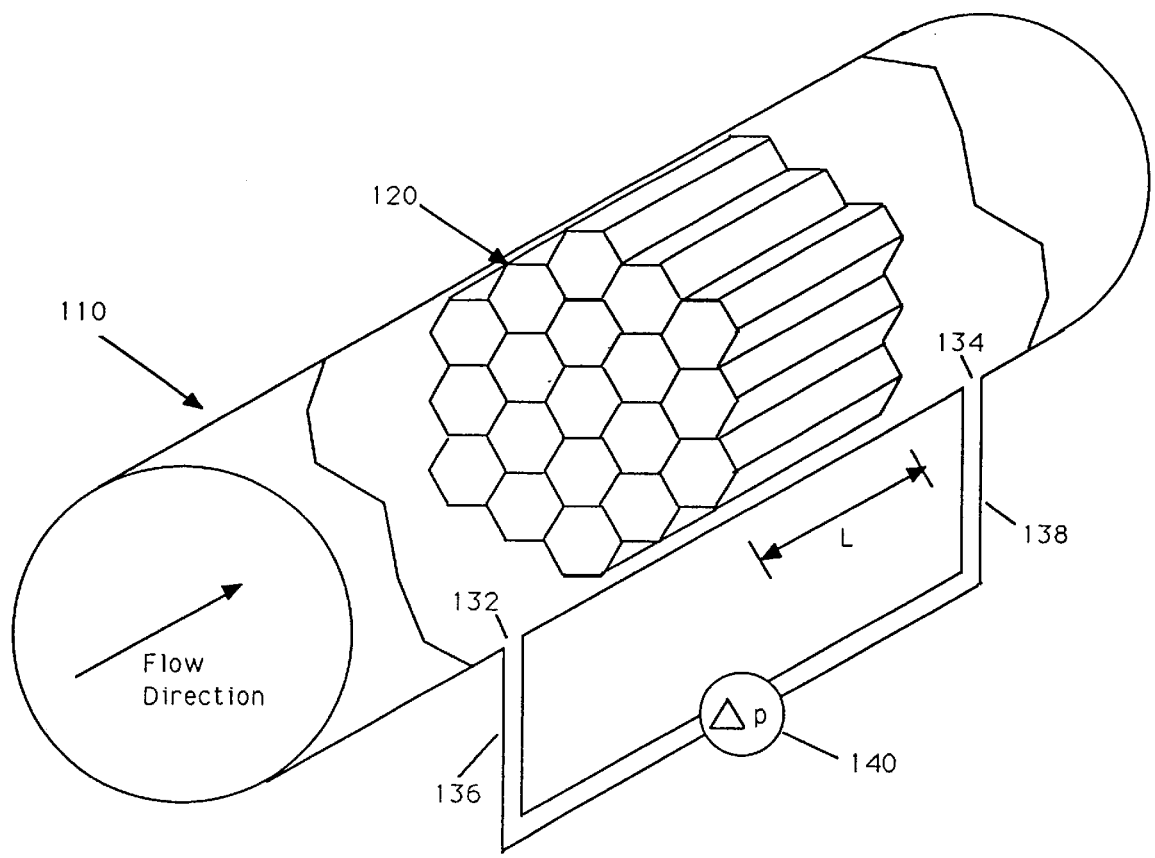
FIG. 3
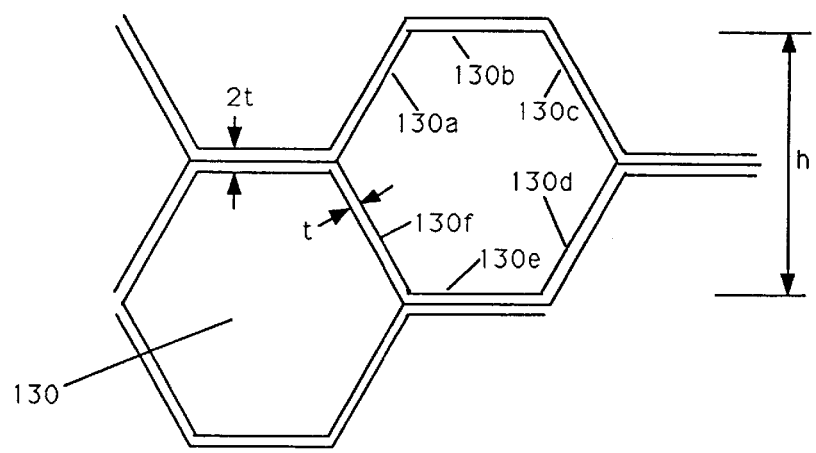

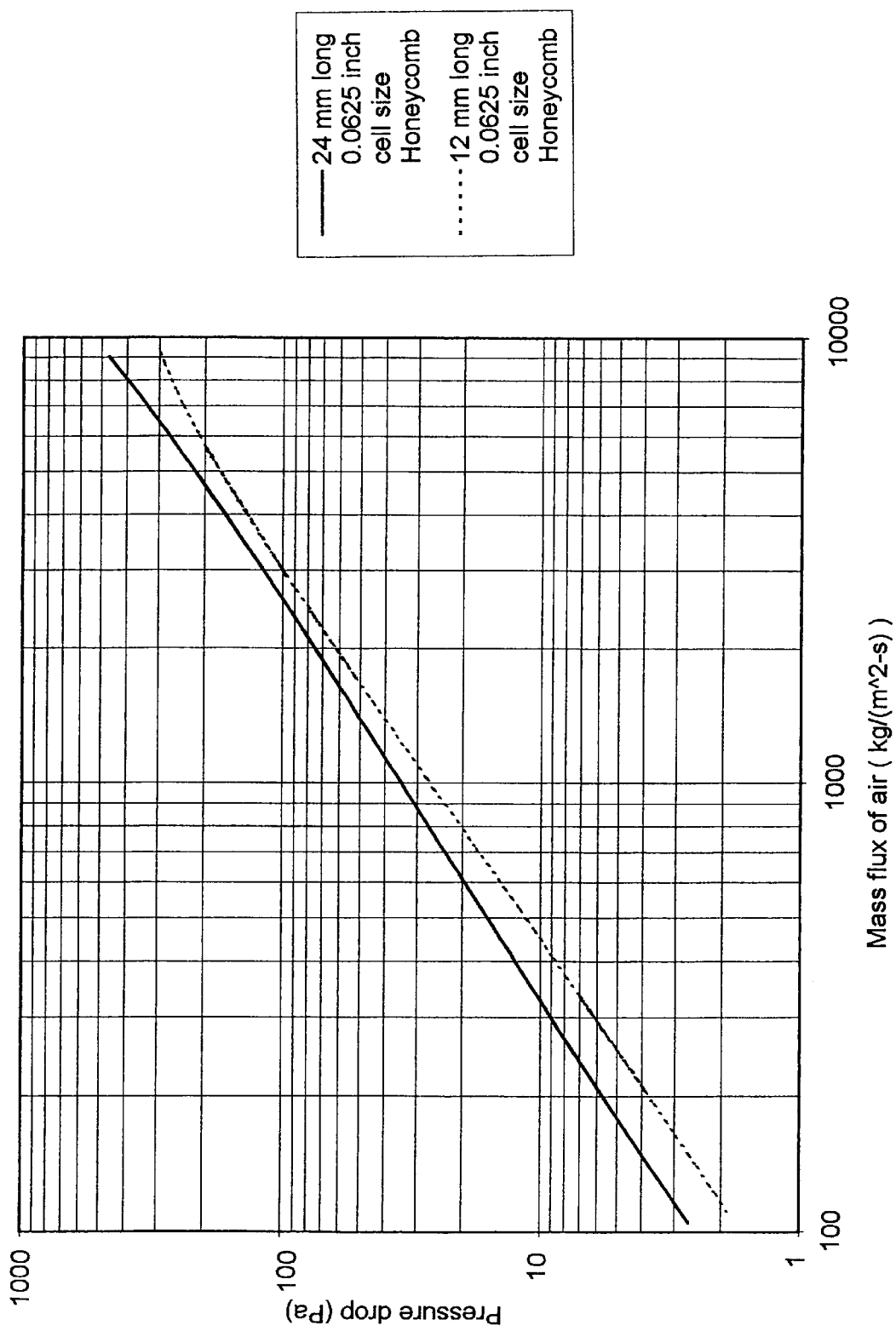

FLOWMETER BASED ON PRESSURE DROP ACROSS PARALLEL GEOMETRY USING BOUNDARY LAYER FLOW INCLUDING REYNOLDS NUMBERS ABOVE THE LAMINAR RANGE

This is a nonprovisional patent application corresponding to my provisional patent application 60/088,726 filed on Jun. 10, 1998.

FIELD OF THE INVENTION

This invention pertains to the field of measurement of fluid flowrate.

BACKGROUND OF THE INVENTION

Among the many techniques for measuring flowrate are those which measure a pressure or pressure difference and then determine flowrate by means of a relationship between that measured pressure and flowrate. Pressure measurements can be measurements at a point (such as a pitot tube), measurements along a line (such as a pitot bar or averaging pitot tube), or measurements which involve the entire flow. The last category of the three categories, i.e., measurements which involve the entire flow, is termed obstruction type flowmeters.

Obstruction type flowmeters are themselves conventionally subdivided into the following three types: orifices, venturis, and nozzles, as described in many basic fluid mechanics texts such as "Fluid Mechanics" by Frank White. An orifice is a calibrated opening, usually sharp-edged, of smaller open area than the duct in which it is placed. A pressure drop, which is irrecoverable, exists across the orifice and this pressure drop is also the signal which is measured to indicate the flow. A nozzle is similar to an orifice in that the measured pressure signal is the irrecoverable pressure drop, but the nozzle is more smoothly contoured than an orifice and so produces a smaller irrecoverable pressure drop, if all other parameters are comparable. Finally, a venturi also employs a contraction to an area smaller than the duct in which it is placed, but it has a region of smooth contouring both upstream and especially downstream of the minimum area, in order to reduce the irrecoverable pressure drop. The pressure signal from a venturi is taken by placing one pressure tap at the wall of the minimum-area passage and another pressure tap upstream or downstream at the full-area duct, and taking the difference between those two readings. In contrast to the orifice and nozzle, the pressure signal from a venturi is due mainly to the change in static pressure between the faster-moving fluid at the minimum area and the slower-moving fluid elsewhere. A venturi of course has some irrecoverable pressure drop, but the pressure signal from a venturi is larger, often many times larger, than the irrecoverable pressure drop.

All of these obstruction type flowmeters are most commonly used in a range which is termed turbulent flow or, if not fully turbulent, at least transition flow. As described by the Reynolds number (which is defined as density*velocity*characteristic dimension which would be the minimum diameter of the orifice nozzle or venturi, divided by the viscosity of the fluid), this would be a Reynolds number above approximately 10000. In these flowmeters the relationship between the pressure signal (measured pressure difference) and flowrate is generally quadratic or almost quadratic, i.e., deltap=C*flowrate^n where n is approximately 2. In fact, in calibrating or describing obstruction type flowmeters, the governing relation between pressure signal and flow is usually quoted as deltap=C*flowrate^2, and any departure from that perfectly quadratic relationship is absorbed into a secondary dependence of the proportionality constant C on Reynolds number and perhaps other quantities such as area ratio.

In the design and selection of flowmeters, an important consideration is the so-called turndown ratio, which is the ratio between the maximum and minimum flowrates measurable with the device. A flowmeter with a larger turndown ratio is more versatile and useful than a flowmeter with a smaller turndown ratio. Basically, the turndown ratio for obstruction type flowmeters derives from the fact that any pressure measuring technology has its own range limitation which is similar to a turndown ratio, that is, the usable range of maximum to minimum values of pressure which are measurable with a given accuracy. The maximum measurable pressure difference is determined by the structural limitation of the diaphragm or similar element within the pressure transducer. The minimum pressure difference is determined by considerations of signal-to-noise ratio and desired accuracy. Because of the quadratic or nearly quadratic relation between pressure signal and flowrate, an obstruction type flowmeter does not achieve an especially large turndown ratio for a given ratio of measurable pressures. For example, for traditional orifices nozzles and venturis, achieving a turndown ratio of 10 in flow measurement requires measuring pressures ranging by a factor of 100. Achieving a turndown ratio of 100 in flow measurement requires pressure measurements differing by a factor of 10000. With a single pressure transducer, achieving a pressure reading ratio of 100 is marginally possible and achieving a pressure reading ratio of 10,000 is virtually impossible. The resulting small turndown ratio is one of the significant disadvantages of obstruction type flowmeters. It may be possible to use two pressure measuring devices of different range if the more sensitive device can be exposed to some degree of overpressure (pressure larger than its design range for measuring) without being damaged, but the limitations of the quadratic relationship are still clearly evident. A flowrate-pressure relationship with an exponent of less than 2 would be desirable in order to enable a larger turndown ratio in flow measurements.

The flowmeter of the present invention does not necessarily operate in the laminar flow regime. However, for sake of comparison, it is also useful to discuss here the laminar flow regime. A classical result is that pressure drop is linearly proportional to flowrate, for the situation of fully-developed laminar flow. This means that the exponent of the pressure drop vs. flowrate relationship is 1, which would be attractive for a flowmeter in those circumstances in which it can be achieved. The geometries for which this derivation is most commonly presented are circular tubes and parallel plates. The restriction about laminar flow implies a low Reynolds number. The restriction about fully-developed flow implies a long flow passage, with the pressure drop or velocity profile being observed sufficiently far away from the entrance region, or else with the overall length being long compared to the entrance region so that the principal behavior is that of the fully-developed flow. Flowmeters are commercially available using a laminar flow element, which is an array of many tubes or flow passages of constant cross sectional area which are fluid mechanically in parallel with each other. In order to meet the restrictions of laminar and fully-developed flow, laminar flow elements are designed with a substantially large L/D (D being the diameter of an individual flow passageway, or an effective diameter if the geometry is non-circular), and effort is made to stay at a Reynolds number which is well within the laminar range. For example, literature from Meriam Co., Cleveland Ohio, one of the commercial suppliers of laminar flow elements, recommends use of the devices only at Reynolds numbers below 300. The pressure drop in the use of Meriam's devices is measured across the entire laminar flow element including the entrance region, which is done on the assumption that the overall length of the laminar flow element is much longer than the length of the entrance (developing flow) region. In another design of laminar flowmeter, U.S. Pat. No. 5,511,416 recommends a maximum Reynolds number of 2000 or preferably 1000 and adjusts the number of available flow passages or flow area to maintain laminar flow by staying below that Reynolds number. In U.S. Pat. No. 5,837,903, Weigand, with respect to a traditional laminar flow element having a large L/D and intending to operate at low Reynolds number, notes and curve-fits a nonlinearity but carefully remains within the laminar flow regime as described exactly or with only slight corrections by the Hagen-Poiseuille Law. In general the literature pertaining to this geometry teaches away from using this geometry for flow measurement at any Reynolds number above the strictly laminar range, i.e., a Reynolds number of several hundred or at most one to two thousand, because if the flow is not strictly laminar the relationship of pressure drop vs. flowrate is not as simple as for the case of strictly laminar flow. Also, the literature pertaining to this geometry teaches that the effect of the entrance region must be minimized by making the laminar flow element so long that the entrance region is only a small fraction of the overall length. The problem with complying with these teachings of the literature about laminar flow elements is that for many flows of practical interest, the laminar flow element would have to become quite large. It becomes large in cross-section in order to reduce the velocity to a small enough value to meet the Reynolds number restriction, and it is long in order to meet the requirement for L/D of a passageway. It then would also need a substantial size of transition region to go from a possibly turbulent pipe section to a large enough cross-sectional area to produce low velocity laminar flow, followed by a similar transition back to the original cross-sectional area.

OBJECTS OF THE INVENTION

Accordingly, it is an object of the invention to provide a flowmeter based on pressure measurements, such that a larger flowrate turndown ratio is obtainable than is obtained from conventional orifices, nozzles or venturis, for a given pressure measurement ratio.

It is further an object of the invention to accomplish this without the problems of large size which are associated with a conventional laminar flow element. It is further an object of the invention to accomplish this in a way which can be used at larger Reynolds numbers than can conventional laminar flow elements. It is further an object of this invention to develop a geometry of flow obstruction element for which the pressure drop vs. flowrate relationship has an exponent smaller than 2 at Reynolds numbers larger than those traditionally associated with laminar flow.

Finally, it is an object of the invention in one embodiment to combine this invention with a variation of cross-sectional flow area to obtain a still further reduction in the steepness of the relation between the measured pressure quantity and the flowrate.

SUMMARY OF THE INVENTION

This invention is the use of a flow geometry resembling a laminar flow element, i.e., an array of surfaces or passages all of which are substantially parallel to each other and to the general flow direction, but this invention is the use of this geometry at Reynolds numbers which can extend substantially higher than the Reynolds number limitation traditionally taught, and without necessarily adhering to the traditionally taught requirement of long L/D. It has been found that for this geometry at Reynolds numbers higher than traditionally taught, the flowrate vs. pressure drop characteristics are repeatable to good accuracy, and the exponent in the pressure drop vs. flowrate relationship undergoes a smooth, gradual transition from 1 to nearly 2. It is further found that the range over which this transition occurs is so wide (several orders of magnitude in Reynolds number) that this phenomenon provides a substantial range of less-than-quadratic relationship, and it is advantageous to operate in this range which in the past has often been avoided. As a result, it is possible to create a flowmeter operating in this regime whose turndown ratio is larger than previously achievable, for a given pressure measurement ratio. In this regime the relationship between pressure drop and flowrate is not linear as would be the case in laminar flow. However, the relationship is consistent and repeatable and is sufficiently gentler than quadratic that it is worthwhile to use this geometry because it improves the achievable turndown ratio compared to existing obstruction type flowmeters. Various geometries are possible to achieve this including flat plates, honeycomb and others described herein. This invention is essentially a fourth major category of obstruction type flowmeter for turbulent flow, in addition to the orifices, nozzles and venturis already in use.

A further embodiment of this invention deals with the placement of the pressure taps at regions of unequal area, which may be acceptable in some applications. In this embodiment the pressure drop across the flow resistance element has the characteristics just described, but the pressure difference measured to indicate flow has a relationship of measured pressure vs. flowrate which is somewhat gentler than the overall pressure drop.

BRIEF DESCRIPTION OF THE FIGURES

The present invention is shown in the following figures, of which a brief description is given here.

FIG. 3 is a perspective view of an embodiment in which the flow resistance element of the present invention is made of a honeycomb material.

FIG. 7 shows the calculated pressure drop vs. flowrate relationship for that embodiment.

FIG. 10 shows the flowmeter of FIG. 1a comprising additional sensors and electronics for calculating flowrate as influenced by additional variables such as temperature, absolute pressure, and humidity or composition.

DETAILED DESCRIPTION OF THE INVENTION

Figure 1A:
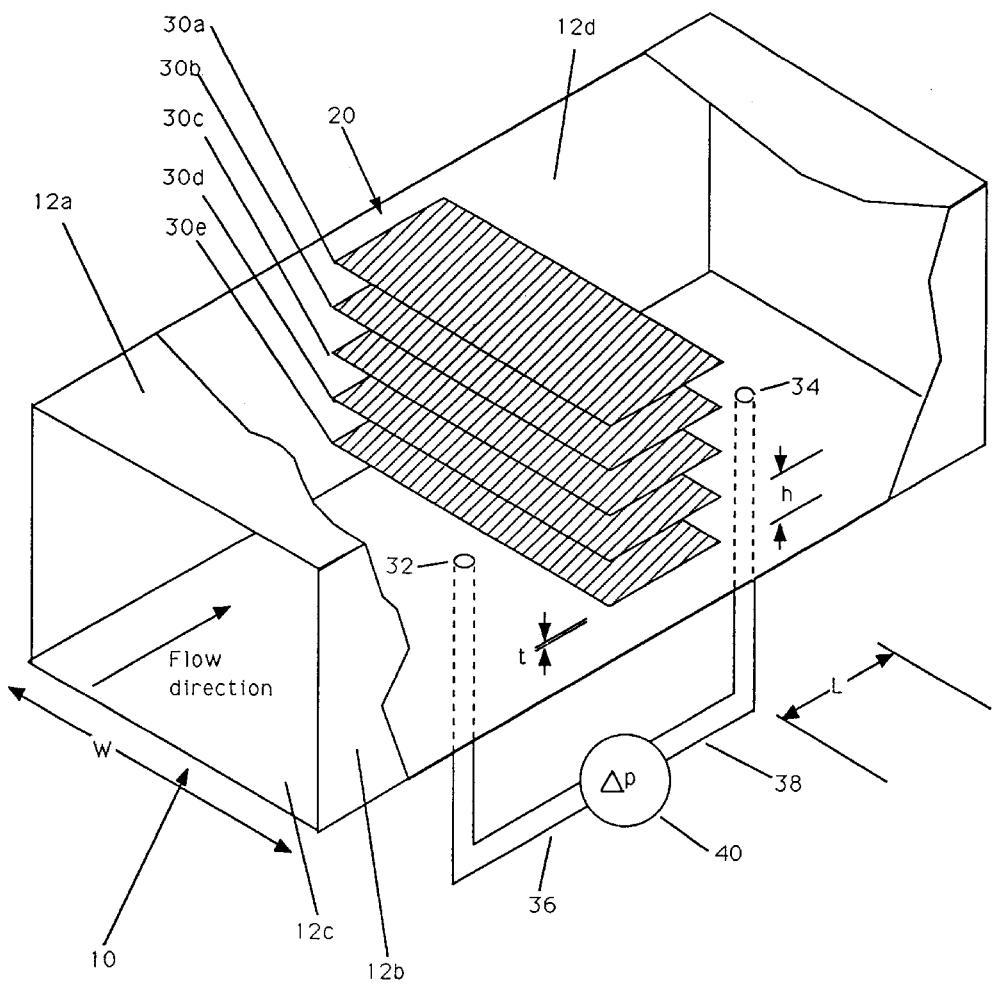
FIG. 1a and FIG. 1b are a perspective and side view of a flow channel containing a flow resistance element of the present invention, shown as being made of flat plates.

At this point, it is useful to introduce and discuss some additional fluid mechanics concepts for use in further explaining the present invention.

The concept of drag is discussed in many fluid mechanics textbooks such as Fluid Mechanics by Frank White. The pressure drop across a flow resistance element is related to the concept of drag, as will be discussed shortly using a control volume argument. The term drag is more frequently used in connection with external flow around an object rather than internal flow in a duct. However, it may be regarded that in the developing-flow region of the geometries proposed here, the flow actually approximates external flow around each individual plate of the flow element because in some circumstances the individual flowfields have not yet merged. Also, in any case it is useful to understand the two contrasting types of drag as taught in the fluid mechanics literature about drag.

The literature of fluid mechanics drag teaches that drag comprises both form drag and shear drag. Form drag is caused by difference in pressure between the upstream and downstream portions of a body. Pressure acts perpendicular to solid surfaces. Form drag is frequently associated with separated flow behind the body, especially a bluff body. Shear drag is associated with shear along the surface of the body, i.e., force exerted on a surface in a direction parallel to the surface. A foremost example of a structure designed to minimize form drag and have predominantly shear drag (because shear drag is unavoidable) is an airplane wing at zero angle of attack. In general, streamlined shapes fit this description. A contrasting example in which form drag dominates is a bluff body, and an example closely related to the present discussion of flowmeters, is the orifice of a conventional orifice flowmeter. In a conventional orifice flowmeter there is a significant region of separated flow and turbulent mixing just downstream of the orifice plate, and this resembles form drag. The principle for designing the flowmeter element of the present invention is that the flow element should have primarily shear drag and should have as little form drag as possible, i.e., it should resemble the situation of the airplane wing rather than the situation of the orifice. In order to accomplish this, it uses primarily flat surfaces which are parallel to the principal direction of flow and it avoids as much as possible regions of separated flow.

Because the present invention comprises flat surfaces parallel to the principal direction of the flow, there is another classical fluid mechanics result which is useful to refer to. This is the solution for the laminar boundary layer in flow along a flat plate parallel to the principal direction of the flow, commonly known as the Blasius solution. This is also described in "Fluid Mechanics" by Frank White. This laminar boundary layer solution specifically applies to flow which is external flow and so is not fully developed, because it allows the boundary layer to grow without ever encountering anything other than the free stream boundary solution. This makes it a contrast to the solution for fully developed laminar flow in a duct, which requires a geometry so that boundary layers which originated on individual surfaces can merge with each other. In "Boundary Layer Theory" by Hermann Schlichting, there is a graph which relates both the result from boundary layer theory and the result of laminar fully developed flow by showing how the pressure drop per unit length transitions from a nonlinear result initially near the entrance (where the flows are not merged) to the linear result of the laminar fully-developed solution. In the Blasius solution the flow outside the boundary layer may be turbulent but the flow within the boundary layer is laminar. The boundary layer can remain laminar up to quite high values of Reynolds number of the external flow, as described by White.

The Blasius solution states that the thickness of the laminar boundary layer is inversely proportional to the square root of the velocity of the free stream. In general, for a laminar boundary layer, the local shear stress on the flat plate (which is then integrated over the entire surface area to obtain the drag force) should be given by the viscosity times the velocity gradient at the surface. The velocity gradient is proportional to the free stream velocity and inversely proportional to the thickness of the boundary layer. (As velocity increases, the boundary layer becomes thinner and is kept closer to the wall.) Thus, according to this derivation, the exponent of the relationship between overall drag force and velocity should be composed of a power of 1 for proportionality to velocity itself plus a power of 0.5 for dependence of boundary layer thickness on velocity, for a total of 1.5. In other words, the shear stress at the wall, and hence the drag force, should be proportional to velocity to the 1.5 power. This prediction holds for a wide range of conditions even for external flows which would be considered turbulent. The shear force is essentially related to pressure drop as may be realized by drawing a control volume. This result suggests that a geometry of obstruction may be found which gives a flowrate-pressure exponent of less than 2, even for flows which would be considered turbulent. This suggestion of a parallel-plate geometry and its suggestion that the exponent for that geometry may be less than 2 is probably the principal contribution of boundary layer theory, more so than specific numerical predictions. This offers the opportunity of increasing the turndown ratio of the flowmeter for a given range of measurability of pressure.

Embodiment 1

Figure 1B:
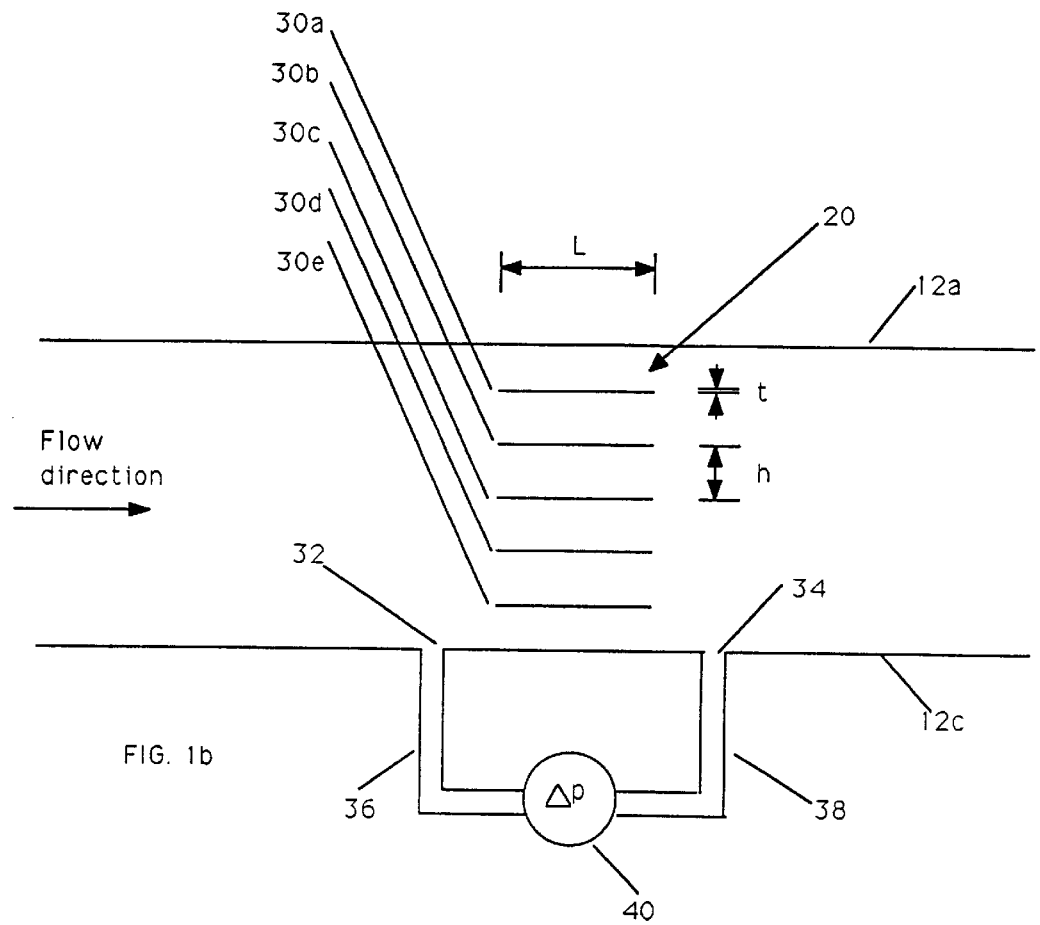

The present invention is shown schematically in FIG. 1a (perspective view) and FIG. 1b (side view) as Embodiment 1. It comprises a flow channel 10, in this case of rectangular cross-section, defined by walls 12a (top), 12b (side), 12c (bottom) and 12d (side), with 12a being parallel to 12c and 12b being parallel to 12d, so that the flow channel 10 is straight and of constant cross-sectional flow area. For clarity of illustration in FIG. 1a, walls 12a and 12b are shown partially cut away, and all of the walls 12a, 12b, 12c and 12d are shown as having zero thickness. Within flow channel 10 flows a fluid with a principal flow direction which is parallel to walls 12a, 12b, 12c and 12d as indicated in FIG. 1a. Mounted inside flow channel 10 is a flow resistance element 20 which extends across the entire cross-section of flow channel 10 such that all of the flow is required to pass through some portion of flow resistance element 20. Flow resistance element 20 comprises a plurality of plates 30 which are all flat and substantially parallel to each other and to the principal direction of flow and to two of the walls 12a and 12c of the flow channel 10. For clarity of illustration there are shown five plates 30a, 30b, 30c, 30d and 30e.

Figure 1C:
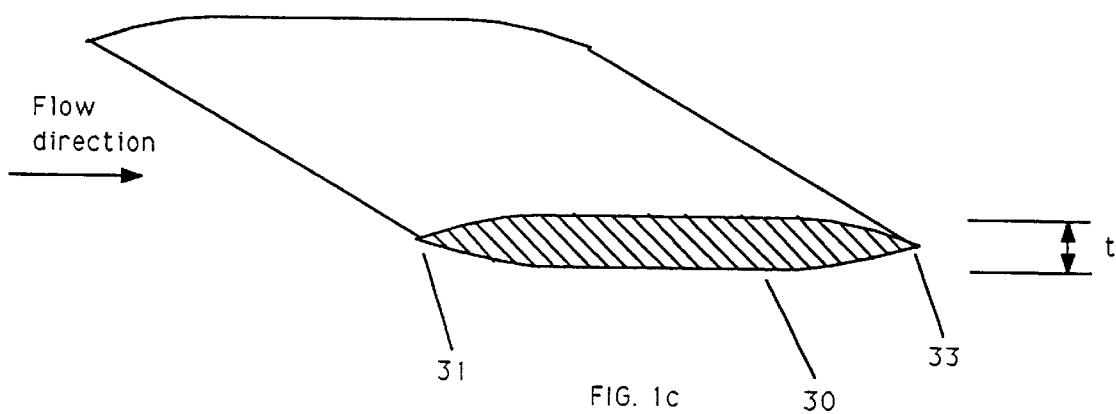
FIG. 1c is a detail of FIG. 1b showing optional streamlining of the leading and trailing edges of one of the flat plates.

However, in practice it would probably be preferable to have more than five plates. Plates 30 have a thickness t, a center-to-center separation dimension h, a length L along the principal flow direction, and a width dimension W (the distance between walls 12b and 12d). All of these dimensions are shown in FIG. 1a. Preferably, plates 30 are relatively thin compared to the distance between them in a direction transverse to the flow, i.e., t is substantially less than h. In FIG. 1a the thickness t of plates 30 is shown as being only the thickness of a line, but the dimension t is labeled anyway. Preferably, dimension W is sufficiently large that the flow is essentially two-dimensional (planar), i.e., the end effects at side walls 12b and 12d are negligible. Preferably the length L is somewhat greater than the separation dimension h, but the ratio L/h does not need to be extremely large, i.e., a value between 2 and 50 is quite acceptable. Larger values are also acceptable. If the plates 30 are thin (t/h<<1) as preferred, then the details of their leading and trailing edges are probably unimportant. However, if desired the leading and trailing edges of plates 30 may be contoured to provide a more streamlined shape. A plate 30 with a tapered leading edge 31 and a tapered trailing edge 33 is shown in FIG. 1c. In FIG. 1c, for clarity of illustration, the thickness of the plate 30 is exaggerated.

Static pressure is the pressure of fluid which is moving and is the pressure which would be experienced by an object moving with the fluid at the exact local speed of the fluid. (This is contrasted with stagnation pressure, which would be measured by an object such as a pitot tube which brings the fluid to rest in front of it.) In practice, static pressure is measured by means of a small hole in a surface which is parallel to the local direction of flow. The absence of fluid motion transverse to such a surface implies approximate equality of the static pressure of the moving fluid and the pressure at the hole in the surface. A pressure tap is a small hole in the surface which bounds a flow, which connects to a means for measuring pressure. Preferably the hole is approximately perpendicular to the local surface and is small compared to the dimensions of other features which may be important to the flow. Shown in FIG. 1a are two static pressure taps. Upstream static pressure tap 32 is a small hole in the duct boundary such as for example surface 12c, located slightly upstream of flow resistance element 20, suitable to measure the static pressure of the fluid at that location. Similarly downstream static pressure tap 34 is a small hole in the duct boundary (12c), located slightly downstream of flow resistance element 20, suitable to measure the static pressure of the fluid at that location. Upstream static pressure tap 32 and downstream static pressure tap 34 are connected by conduits 36 and 38, respectively, to opposite sides of a differential pressure measuring device 40. The differential pressure measuring device 40 can be a differential pressure transducer or a mechanical gage or manometer or other differential pressure measuring device as is well known in the art.

Figure 2:
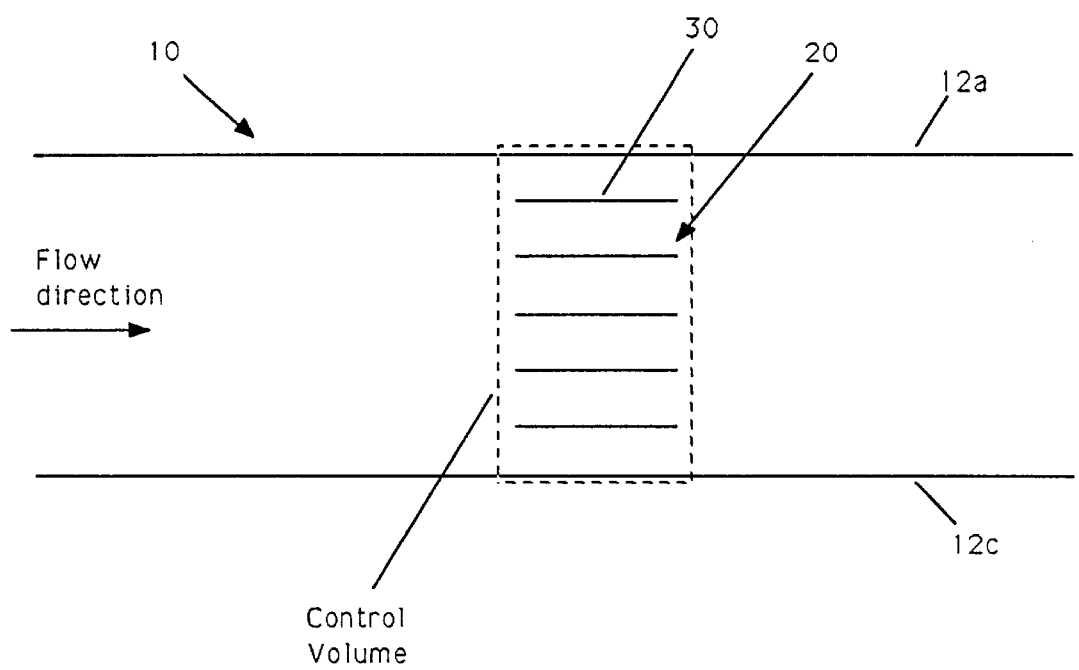
FIG. 2 is a drawing showing a control volume representation of the situation in FIG. 1.

FIG. 2 shows a control volume for fluid mechanics analysis describing the geometry of FIG. 1a. FIG. 2, like FIG. 1b, is a side view or cross-section of the array of plates drawn in FIG. 1a. The control volume, which is shown by the dashed line, extends from just upstream of flow resistance element 20 to just downstream of it, and includes the entire interior of that portion of duct 10 and the walls of the duct. Flow resistance element 20 comprises parallel plates 30a, 30b, 30c, 30d and 30e just as in FIG. 1a. The force acting on the fluid includes all of the drag interaction between the fluid and both sides of all of the parallel plates 30, and also the drag interaction between the fluid and the top wall 12a and bottom wall 12c of the duct. (As the number of plates becomes large, the drag interaction with the walls 12a and 12c becomes insignificant compared to the drag interaction with the plates.) The other forces acting on the control volume are the pressure * cross-sectional area of the upstream boundary and the pressure * cross-sectional area of the downstream boundary. The difference in force between the upstream and downstream cross-sectional areas is equated to the total (integrated) drag force of the fluid acting on all of the plates (and on the duct wall). This helps to justifying using the result of a calculation such as the Blasius calculation for the purpose of calculating pressure drop across the geometry of parallel plates used as a flow-meter obstruction element.

Embodiment 2

The geometry of parallel plates, shown in FIG. 1a, corresponds to the most readily analyzable geometries such as the Blasius solution which has already been discussed. However, the parallel-plate geometry shown in FIG. 1a is not necessarily the most convenient geometry to manufacture. Another possible geometry is that of a honeycomb, which is an array of parallel thin surfaces of hexagonal shape. Honeycomb is an array of open hexagonal cells which are substantially parallel to and identical to each other. This is shown in FIG. 3. Numbering of the components is analogous to the numbering in FIG. 1. The flow is contained in a duct 110 preferably of constant cross-sectional area. Duct 110 is shown as having a circular cylindrical shape, i.e., a tube, although it could also be rectangular or of other shape. Occupying the full cross-sectional area of duct 110 at the measurement location is flow resistance element 120. As previously, an upstream static pressure tap 132 is located just upstream of flow resistance element 120 and a downstream static pressure tap 134 is located just downstream of flow resistance element 120. They are connected as before by conduits 136 and 138 respectively to differential pressure sensing device 140. In this example, flow resistance element 120 is made of a honeycomb material which comprises a plurality of openings or hexagonal cells 130, each having a hexagonal cylindrical shape, having sides 130a, 130b, 130c, 130d, 130e and 130f, which together make up a hexagon. Each of those six sides furthermore forms a side of an adjacent hexagonal cell. Honeycomb material is frequently used as a structural element in components which must have a high strength-to-weight ratio, because it is mostly open space and yet is strong in certain directions. It is also sometimes used as a flow straightener for wind tunnels and other fluid flow devices. It is available from Hexcel Corp., Dublin Calif., and other manufacturers. Honeycomb is often manufactured by stacking sheets of metal foil, which are bonded to each other in some places but not others, and then stretching the stack. In honeycomb which is made by such a process, the unbonded surfaces have a thickness t and the surfaces bonded between adjacent sheets have a thickness of 2*t, as also shown in FIG. 3. In FIG. 3 in the overall view, for ease of illustration, all of the walls of all of the hexagons are shown as having a thickness of a single line thickness, but the enlarged view of only a few cells of hexagon shows the appearance with single and double thickness as would be the case if the honeycomb were made by the process of stacking and bonding and stretching foil. The height of a honeycomb cell, h, refers to the dimension between double-thickness sides of such a hexagon. As previously, the dimension L refers to length along the flow direction. These dimensions are labeled in FIG. 3. Typical dimensions of honeycomb, which are the dimensions used for the present experimental data, are as follows: foil thickness, t, 0.001 inch; cell height h of the honeycomb, 0.0625 inch (1.59 mm); length L along the flow direction, 12 mm or 24 mm. This is at the lower end of the range of commercial honeycomb cell heights, but is readily available. This gives an L/h ratio of 8 for the shorter honeycomb and 16 for the longer honeycomb. Just as in FIG. 1a, for ease of illustration, in FIG. 3 only a relatively small number of hexagonal cells 130 are shown as being contained within the duct 110. In practice, it would be preferable to have more. The data presented later was taken with a 0.0625 inch cell size honeycomb (nominal height of the hexagonal cell) in a 2.5 inch (nominal) diameter pipe, so there were hundreds of cells.

From a fluid mechanics point of view, a round tube is an internal axisymmetric flow in contrast to the two dimensional planar flow situation described in FIG. 1a. The hexagonal cell of honeycomb is not very different from a round tube. At the very beginning of the boundary layer near the leading edge of such a channel, the boundary layer should be thin enough that even this situation approximates a boundary layer on a flat plate. Further downstream where the boundary layers are not so thin, there are expected to be some details differing between the planar situation and the axisymmetric or nearly axisymmetric situation of a round tube or a hexagon. However, the scaling with the principal variables such as those involved in the Reynolds number should remain, as should the general behavior of the pressure drop vs. flowrate relationship. In discussing flow inside a cell of hexagonal shape or other shape, it is useful and conventional to define a hydraulic diameter as is conventionally done in fluid mechanics textbooks as 4*cross sectional area/perimeter. For a regular hexagon, the hydraulic diameter is identically equal to the height h.

For a typical honeycomb material, the pressure difference measured by pressure measuring device 140 is related to the volumetric or mass flowrate Q by a relationship such as is given in FIG. 4. FIG. 4 is experimental calibration data taken using the setup illustrated in FIG. 3, with flowing air at room temperature and atmospheric pressure at the discharge, with the previously described dimensions of honeycomb and pipe. Honeycomb samples with two different dimensions of the length along the flow direction were available, 12 mm and 24 mm. Since no one pressure transducer was capable of accurately measuring pressures over such a wide range, the data in FIG. 4 were taken with two different transducers, with the transducer being pre-selected for either the high or the low flowrate range depending on the flowrate. FIG. 4a shows smoothed lines representing the data.

Figure 4A:
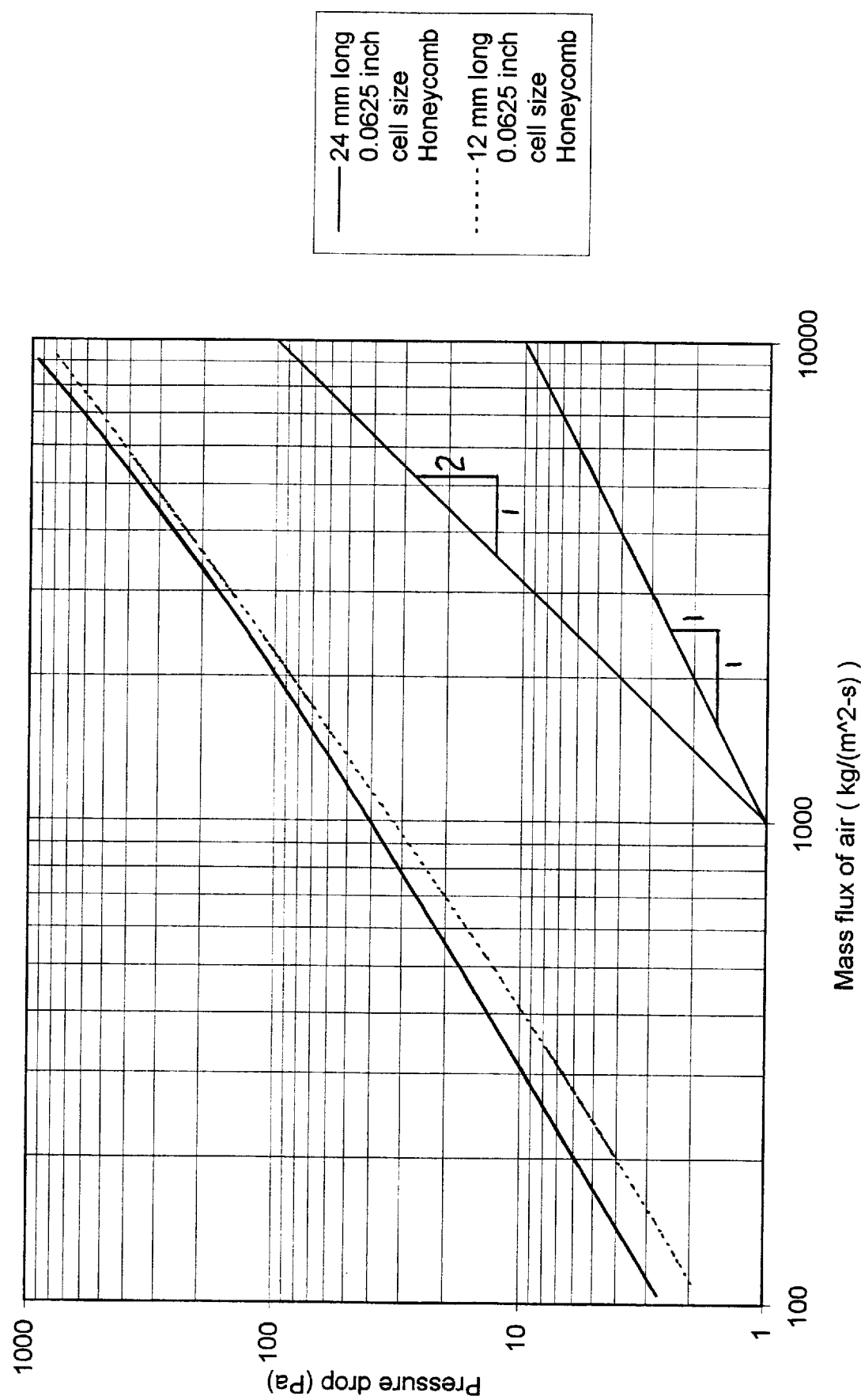
FIG. 4a shows the experimentally measured (smoothed) relationships between pressure drop and flowrate (mass flux) for two typical honeycomb materials.

The horizontal axis in FIG. 4a is plotted as mass flowrate per unit cross-sectional area (which is essentially velocity). The vertical axis is pressure drop across the honeycomb flow resistance element. Both axes are plotted using a logarithmic scale. In this way, the exponent of the pressure drop vs. flowrate relationship can be readily discerned as the slope of the curve on that plot. For comparison, a slope of 1 (corresponding to laminar flow) is illustrated, as is a slope of 2 (corresponding to turbulent flow and conventional flow resistance elements).

It can be noted first of all that the average slopes of the two curves are roughly in the range of 1.5, as predicted by the Blasius solution. The data cover just under two orders of magnitude in flowrate and slightly less than three orders of magnitude in pressure drop, and the average slope calculated using the endpoints of that range gives less than 1.5 as the exponent. In somewhat more detail, it can be seen that each plot exhibits a slight curvature within the interval but even locally at the high end flowrate it has not reached a slope of 2. This illustrates that the region of transition between the laminar exponent of 1 and the turbulent exponent of 2 is substantially wide, more than two orders of magnitude. According to the Blasius solution, the thickness of the boundary layer, delta, at a point a distance L downstream from the leading edge is given by delta/L=5/sqrt(Re), where the length dimension used in calculating Re is L. Thus, for the honeycombs used here, at the low-flowrate end of the data in FIG. 4, the boundary layers on adjacent surfaces are predicted to have merged before the end of the channel formed by an individual honeycomb cell, so that by the downstream end of the channel the situation resembles laminar fully-developed flow, but at the high flowrate end of the data in FIG. 4, the boundary layers are predicted not to have merged before the end of the channel formed by an individual honeycomb cell. Thus, for the high end flowrate this geometry violates both the traditionally taught Reynolds number limitation for a Laminar Flow Element and the traditionally taught requirement for fully developed flow for a Laminar Flow Element, and yet it has a flowrate vs. pressure drop relationship which is consistent and repeatable and has a log-log slope which is usefully less than 2. In comparing exponents, it is also worth noting that if flow in the same duct were to be measured by a conventional orifice flowmeter, the Reynolds number of that orifice would be calculated using the diameter of the orifice, while the Reynolds number for the honeycomb would be calculated as described using the dimension of an individual honeycomb cell. In the geometry for which data of FIG. 4 was taken, the diameter of an orifice would be more than one order of magnitude larger than the dimension of an individual honeycomb cell.

Furthermore, constricting the flow from the full duct cross-sectional area to a smaller open area of the orifice further increases the velocity and hence further increases the Reynolds number of the orifice. Thus, the Reynolds number for the orifice would be substantially larger than the Reynolds number for the honeycomb and especially at the high end flowrate would be well into the turbulent range. This, combined with the fact that the orifice geometry encourages separated flow, would push the exponent of the pressure drop vs. flowrate relationship even more towards the turbulent limit of 2, for the same flow for which the exponent of the present geometry is as given here.

It is useful to look at the ratio of pressure drops for a factor of 100 difference in flowrate. For the 12 mm long honeycomb, the factor is 520, and for the 24 mm long honeycomb the factor is 440. This would probably make the longer honeycomb slightly preferable, unless consideration of magnitude of pressure drop dictated otherwise. Using the two endpoints separated by a factor of 100 in flowrate, one can calculate an exponent averaged over that interval, for each honeycomb. The exponent is 1.36 for the 12 mm long honeycomb and 1.32 for the 24 mm long honeycomb. Although calculating local slopes can introduce error, it is possible to perform a curve-fit and from that obtain local log-log slopes for each of the honeycomb samples. For the short honeycomb the local slope varies from 1.17 at the low end to 1.50 at the high end, which combine to give the previously reported average value based on the endpoints of 1.36. For the long honeycomb there seems to be somewhat more curvature, with the local slope varying from 1.24 at the low end to 1.74 at the high end, which combine to give the previously reported average value based on the endpoints of 1.32. All of these slopes are larger than the laminar exponent of 1 but still less than the turbulent exponent of 2.

Since data are available for two different honeycombs which differ only in length dimension L by a factor of 2, some comparisons can be made on the basis of length. It can be noted, first of all, that for equal flowrates the measured pressure drop does not differ by a factor as large as 2. Rather, at the high end flowrate the longer honeycomb has a pressure drop 1.25 times as large as the shorter honeycomb, and at the low end flowrate the longer honeycomb has a pressure drop 1.47 times as large as the shorter honeycomb. According to predictions from the Blasius solution, the ratio of integrated shear forces for flat plates whose length differs by a factor of two should be sqrt(2) or 1.41. This indicates reasonably good agreement. The Blasius solution gives the integrated shear or drag force on one surface of a flat plate as Drag force=0.664*$W$*($rho$^0.5)*($mu$^0.5)*($U$^0.5)*$L$^0.5, where W is the width of the plate transverse to the flow, rho is the fluid density, mu is the fluid viscosity, U is the free stream velocity, and L is distance from the leading edge of the plate.

Figure 4B:
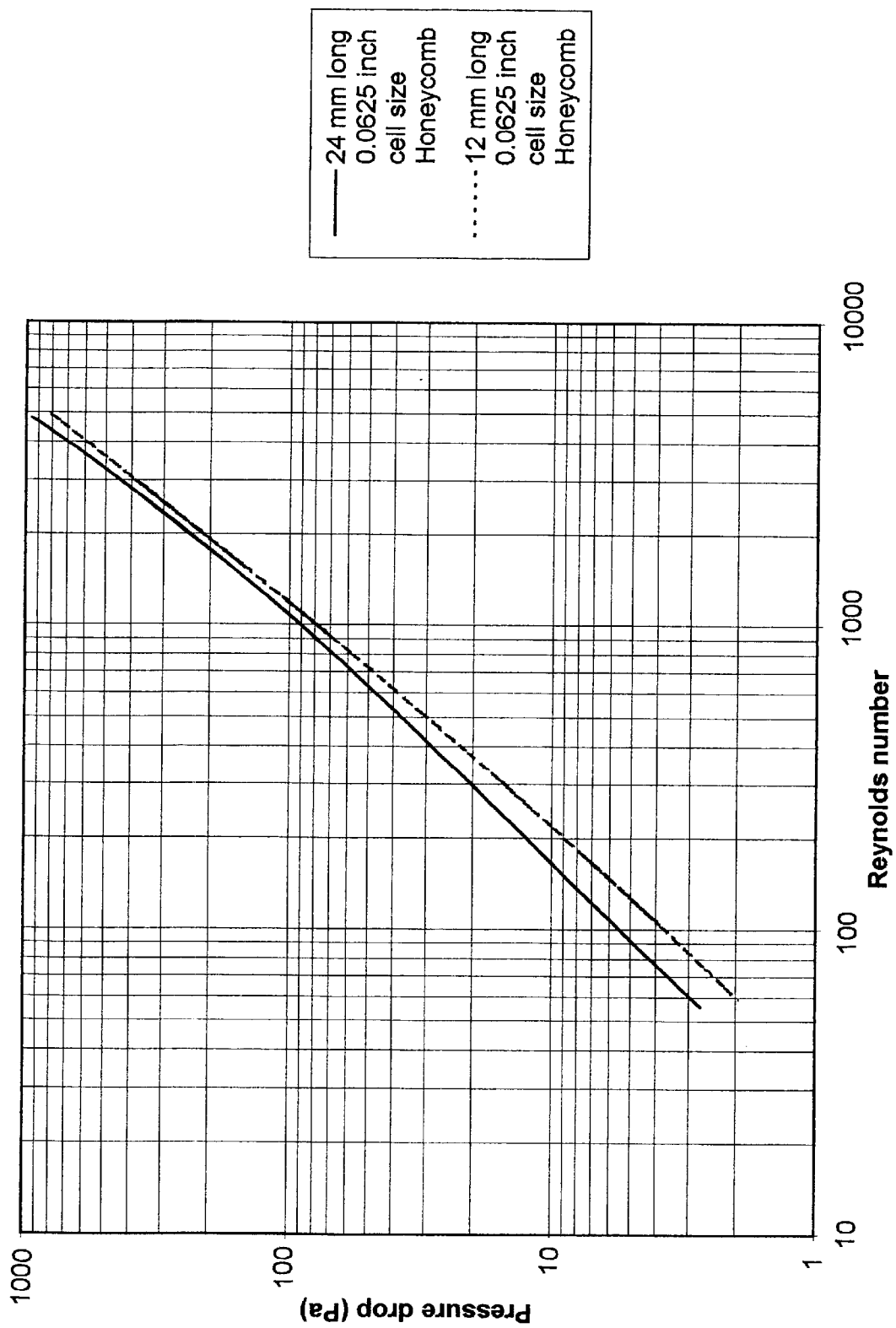
FIG. 4b shows the same data as FIG. 4a except it is plotted against a horizontal axis which is the Reynolds number.

FIG. 4b is the same data as FIG. 4a plotted against a horizontal axis which is the Reynolds number. (The Reynolds number for this graph is calculated using the approach velocity of the fluid in the duct; the density of the fluid; the viscosity of the fluid; and the cell height h of the honeycomb material, because this is a convenient dimension which for a regular hexagon is the same as the hydraulic diameter.) FIG. 4b indicates that the Reynolds number range of the present data extends somewhat above the laminar range, which is frequently considered to end at a Reynolds number of 2000. By extrapolation it can be estimated that the behavior of an exponent less than 2 continues for some additional range of larger Reynolds number beyond the range of the present data. If the working fluid is air near atmospheric pressure and room temperature, for the present honeycomb, it would only be possible to increase the Reynolds number a little bit further before the flow was well into the compressible regime, a regime in which it is not so desirable to operate for flowmetering. However, with water and other fluids it would be quite possible to operate at higher Reynolds numbers.

Figure 4C:
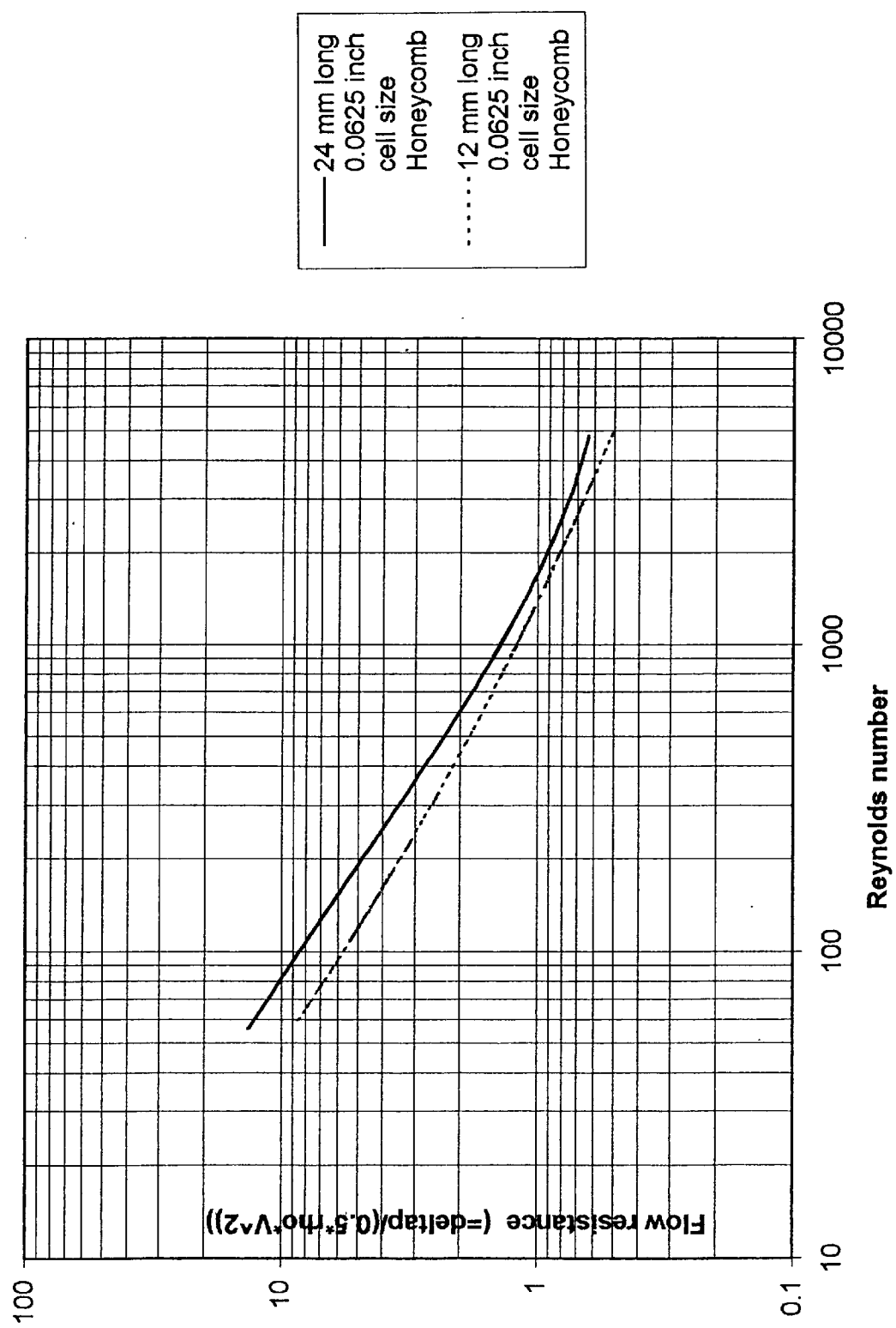
FIG. 4c shows the same data as FIG. 4a plotted as flow resistance as a function of Reynolds number.

FIG. 4c shows the same data plotted as pressure drop normalized by 0.5*density*velocity^2, which is a flow resistance resembling a friction factor. This plot resembles the well-known Moody chart, but the principal difference is that the Moody chart is for very long pipes with fully-developed flow and the vertical axis is further normalized by L/D, whereas this plot is for the described geometry, which is not dominated by fully-developed flow, especially not at the high end of the range of flowrates.

Figure 4D:
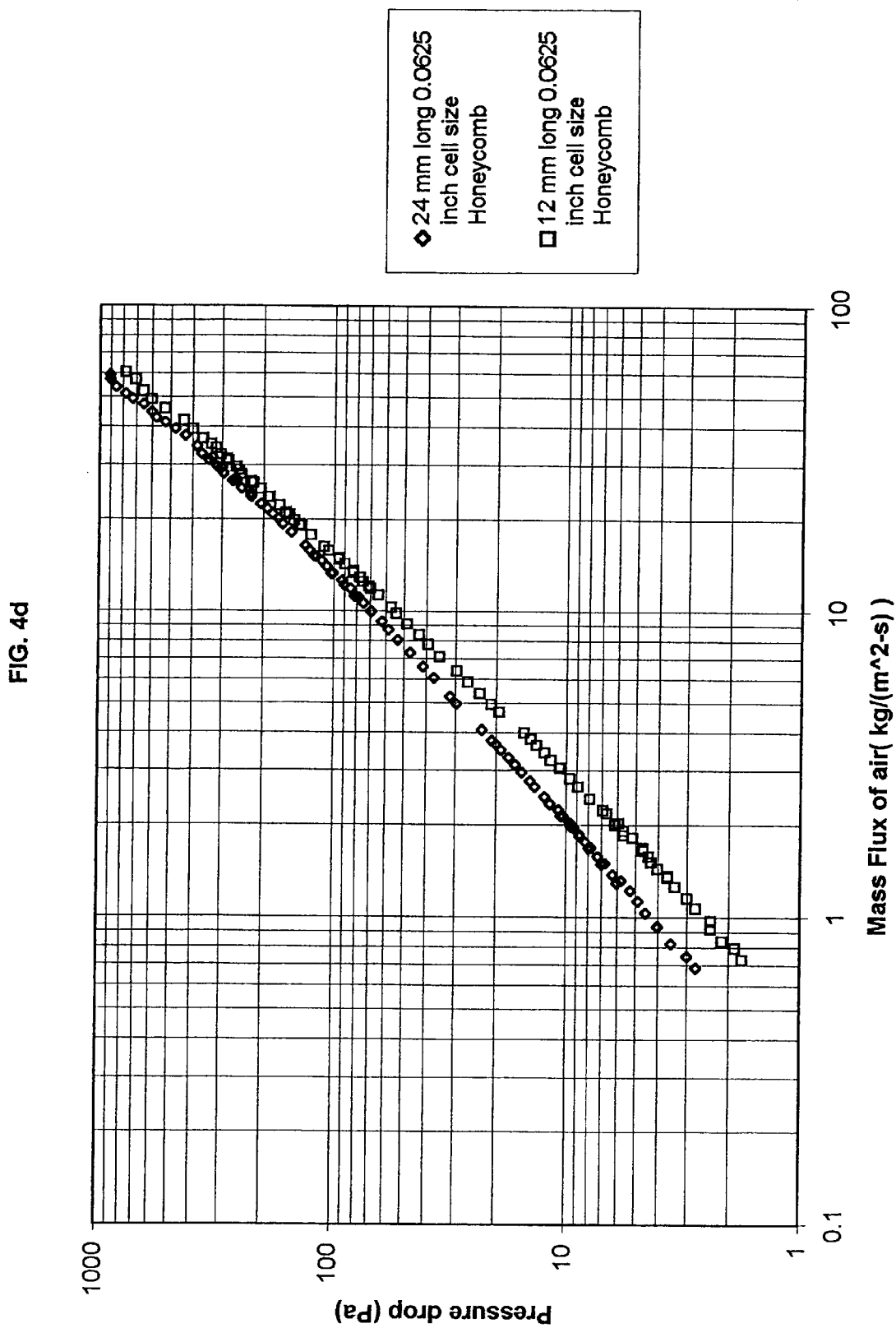
FIG. 4d shows the same data plotted in FIG. 4a, as individual data points.

FIG. 4d shows the raw data points for the same data plotted in FIG. 4a. It can be seen that the data are compact with little scatter, making the relationship suitable for use in flow measurement. It can be noted that in taking the experimental data at flowrates around the lower-middle of the range of data presented, there was some unsteadiness and the reported values are time-averaged values. At flowrates which were either smaller or larger, the pressure readings were more steady and there was not much need to average readings over time.

Evaluation of the usefulness of these results may be made by noting what is the ratio of pressure drops for a flowrate ratio or turndown ratio of 100. For the data presented here for each length of honeycomb, the experimentally measured ratio of pressure drops is roughly 500. The ratio for a laminar-flow situation would be 100, the ratio for the turbulent situation would be 10,000, and the ratio for the exponent of 1.5 suggested by the boundary layer solution would be 1000. The experimentally determined ratio of pressure drops is none of these numbers, but it is significantly smaller than the 10,000 expected for the fully turbulent limit of obstruction type flowmeters. Any amount by which it is smaller than 10,000 indicates possible benefit in terms of the turndown ratio of a flowmeter. A pressure ratio of 500 for a flowrate ratio of 100 means that the average exponent over that range is 1.35. This value is used for the following calculation.

The following derivation shows how the flowrate turndown ratio is improved by a change in the exponent of the pressure drop vs. flowrate relationship. To begin, it is necessary to assume a power law form of the relationship between pressure drop and flowrate.

Pressure ratio=(flowrate ratio)^exponent

Exponent=log(pressure ratio)/log(flow turndown ratio)

log(flow turndown ratio)=log(pressure ratio)/exponent

Consider two cases, one turbulent representing existing technology, and one representing the parallel flow geometry of the present invention.

log(flow turndown ratio turbulent)=log(pressure ratio)/(exponent turbulent)

log(flow turndown ratio parallel)=log(pressure ratio)/(exponent parallel)

log(flow turndown ratio parallel)–log(flow turndown ratio turbulent)= log(pressure ratio)/(exponent parallel)–log(pressure ratio)/(exponent turbulent)

log(flow turndown ratio parallel/flow turndown ratio turbulent)= log(pressure ratio)/(exponent parallel)–log(pressure ratio)/(exponent turbulent)

flow turndown ratio parallel/flow turndown ratio turbulent= 10^(log(pressure ratio)/(exponent parallel)–log(pressure ratio)/(exponent turbulent))=

10^(log(pressure ratio)/(exponent parallel))/10^(log(pressure ratio)/(exponent turbulent))=10^(log(pressure ratio)*(1/(exponent parallel)–(1/(exponent turbulent)))=pressure ratio^(1/(exponent parallel)–1/(exponent turbulent))

So, factor of improvement in flow turndown ratio=flow turndown ratio parallel/flow turndown ratio turbulent= pressure measurability ratio ^ (1/(exponent parallel)–1/(exponent turbulent))

Thus, in order to evaluate the improvement in flow turndown ratio, it is necessary to assume pressure measurability ratio. Typical practical values of pressure measurability ratio for a single pressure transducer are probably between 10 and 100. Also, for evaluation purposes we can use a turbulent exponent of 2 and an exponent of 1.35 for the parallel flow geometry. (Even if the turbulent exponent is not exactly 2, this illustrates the benefit of the present invention.) If the pressure measurability ratio is 10, the improvement in turndown ratio is by a factor of 1.74 (i.e., the flow turndown ratio improves from 3.16 for a quadratic exponent to 5.5 for the exponent for a parallel-flow geometry). If the pressure measurability ratio is 100, the improvement in turndown ratio is by a factor of 3.03 (i.e., the flow turndown ratio improves from 10 for a quadratic exponent to 30.3 for the exponent for the parallel flow geometry). This represents a potential tripling of the flow turndown ratio simply by a redesign of the flow element, which can be a significant improvement in turndown ratio. If it were possible to achieve a pressure measurability ratio of 1000, the factor of improvement in the turndown ratio would be by a factor of 5.27.

One particular technology of pressure measuring device which might be advantageously used with the present invention is silicon micromachined pressure transducers. A pressure transducer usually has a range of measurement which is defined by a minimum pressure which can be measured accurately and a maximum pressure which can be measured. If the pressure transducer is constructed using a diaphragm whose deflection is measured, the maximum measurement pressure may correspond to where the diaphragm touches a stop. In addition, a pressure transducer usually also has an overpressure limit which indicates how large the pressure can be (beyond the maximum measurement pressure) without structurally damaging the transducer or changing its calibration. With silicon micromachined pressure transducers, the ratio between the overpressure limit and the maximum measurable pressure is particularly large because of the brittle nature of silicon. A brittle material either fails (fractures) or else remains essentially in its original condition. Breakage is of course not desirable, but constancy of properties up to that point is advantageous. This means that two silicon micromachined pressure transducers of different ranges can be used together. The lower-range transducer can be used to provide sensitivity of measurement at low pressures, and the higher-range transducer can be used to measure pressures where the lower-range transducer is overloaded but still at a pressure less than its failure limit. More than two transducers could similarly be combined. This means that the combination of transducers provides a measurable range of pressure which is substantially larger than that which could be provided by a single transducer. Silicon micromachined pressure transducers are commercially available from Motorola, Inc., and from Data Instruments, Acton, Mass. As was shown in the preceding calculation, the improvement in flow turndown ratio upon going from a quadratic flow resistance to a flow resistance of the present invention is especially noticeable if the pressure measurement ratio is large. The improvement factor is not constant but rather increases as the pressure measurement ratio increases. This makes it especially attractive to use multiple ranges of silicon micromachined pressure transducers with the present invention.

Honeycomb material is actually already used in some flowmeters such as the mass air flowmeters for some automobile engines. Such flowmeters measure the mass flowrate of air for the purpose of calculating how much fuel should be injected into the engine. In general flowmeters work best when there is a substantial length of straight constant-area flow both upstream and downstream of the flowmeter. However, the space constraints near an automobile engine make this impractical. There are frequently bends, area changes and other disturbances both upstream and downstream of the flowmeter, which could influence the flow measurement such that the reading with one nearby duct geometry differs from the reading for a long straight duct geometry or the reading for some other nearby duct geometry. Accordingly, automotive mass air flowmeters sometimes use honeycombs as flow straighteners at the flowmeter inlet port simply to prepare the flow to be measured by some other technique. Most commonly the actual flow measurement technology in such a case is a flow measurement technology based on heat transfer such as a hot film anemometer. In this case the honeycomb serves only to straighten the flow before it reaches the actual flow measuring element. Such a honeycomb does not serve a purpose which is anything at all like the purpose contemplated by the present invention. In fact, in accordance with the present invention, it is possible that what is already used merely as a flow straightener could actually serve as the principal portion of the flowmeter, with consequent simplification of the overall device.

The two geometries discussed so far, i.e., flat plate and honeycomb, are still not the only possible geometries which provide surfaces substantially parallel to the flow direction. Still other possible geometries of flow resistance element are shown in FIG. 5. Numbering in FIG. 5 is by analogy to the numbering in FIG. 1 and FIG. 3, with part numbers increased by multiples of 100.

Figure 5A:
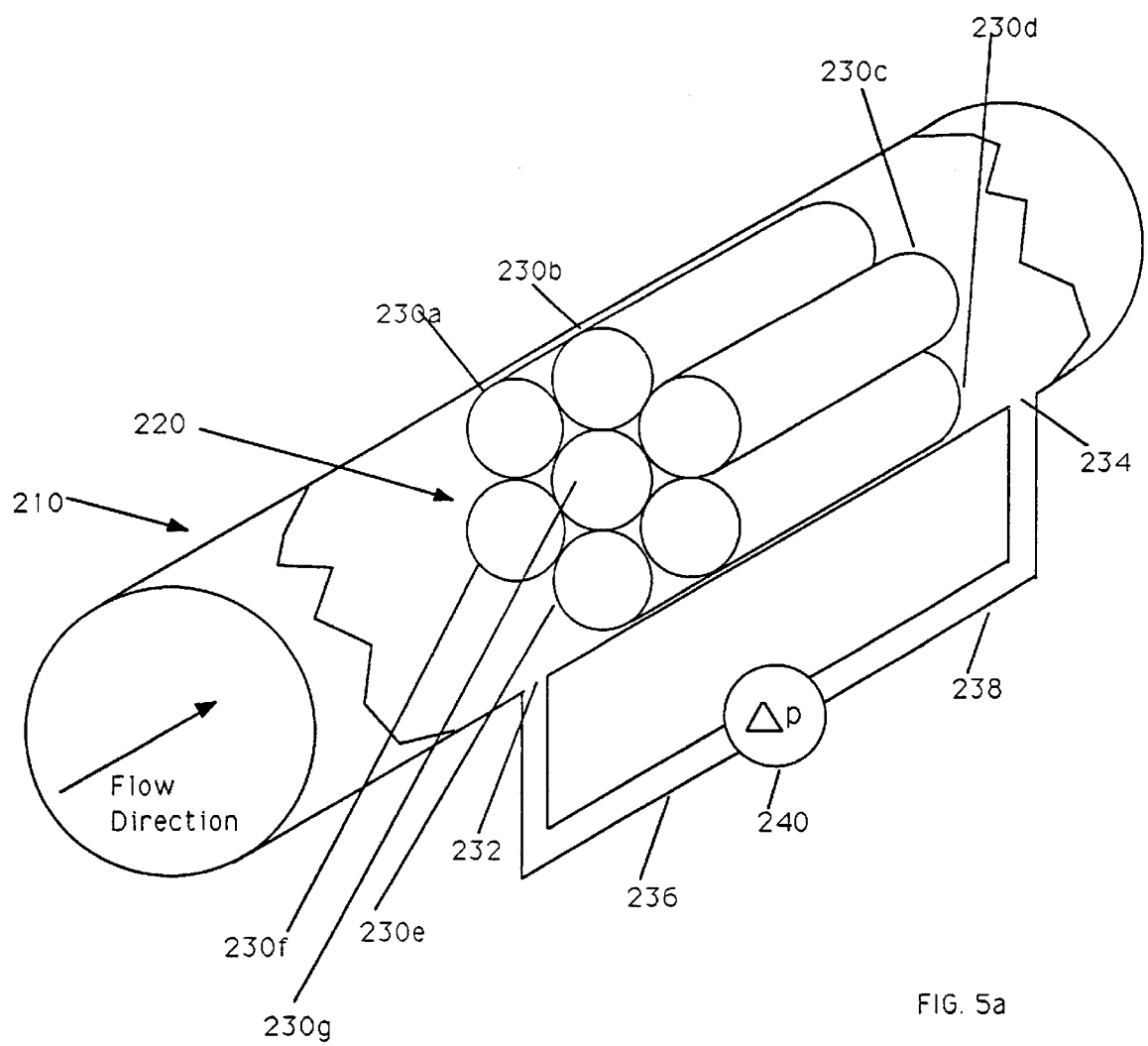
FIGS. 5a, 5b and 5c show some additional alternate geometries in addition to those previously illustrated.

One such geometry is an array of tubes which could be made by physically stacking circular cylindrical tubes. There is shown in FIG. 5a an overall duct 210 in which is placed a flow resistance element 220 which comprises a plurality of circular tubes 230. The tubes are stacked in an array which may be hexagonal (as shown) as a natural pattern of packing, or square, or any other pattern. The open flow passageway comprises the interior of each tube and also the spaces between the tubes. The tubes 230a, 230b, 230c, 230d, 230e, 230f and 230g are shown as being circular cylindrical tubes but they could also be other shapes. Fluid mechanically this geometry is probably similar to a honeycomb. The circular cross-section of the tube interiors is not greatly different from the hexagonal cross-section of honeycomb passageways. There is in addition the small three-cornered passageway between tubes, and that passageway would have a smaller hydraulic diameter than the tube interior. All of these passageways are fluid mechanically in parallel with each other. Just as in previous illustrations, for clarity of illustration, the number of tubes shown is relatively small but a larger number would be preferable. Upstream pressure tap 232, downstream pressure tap 234, conduits 236 and 238 and differential pressure measuring device 240 are also shown.

Figure 5B:
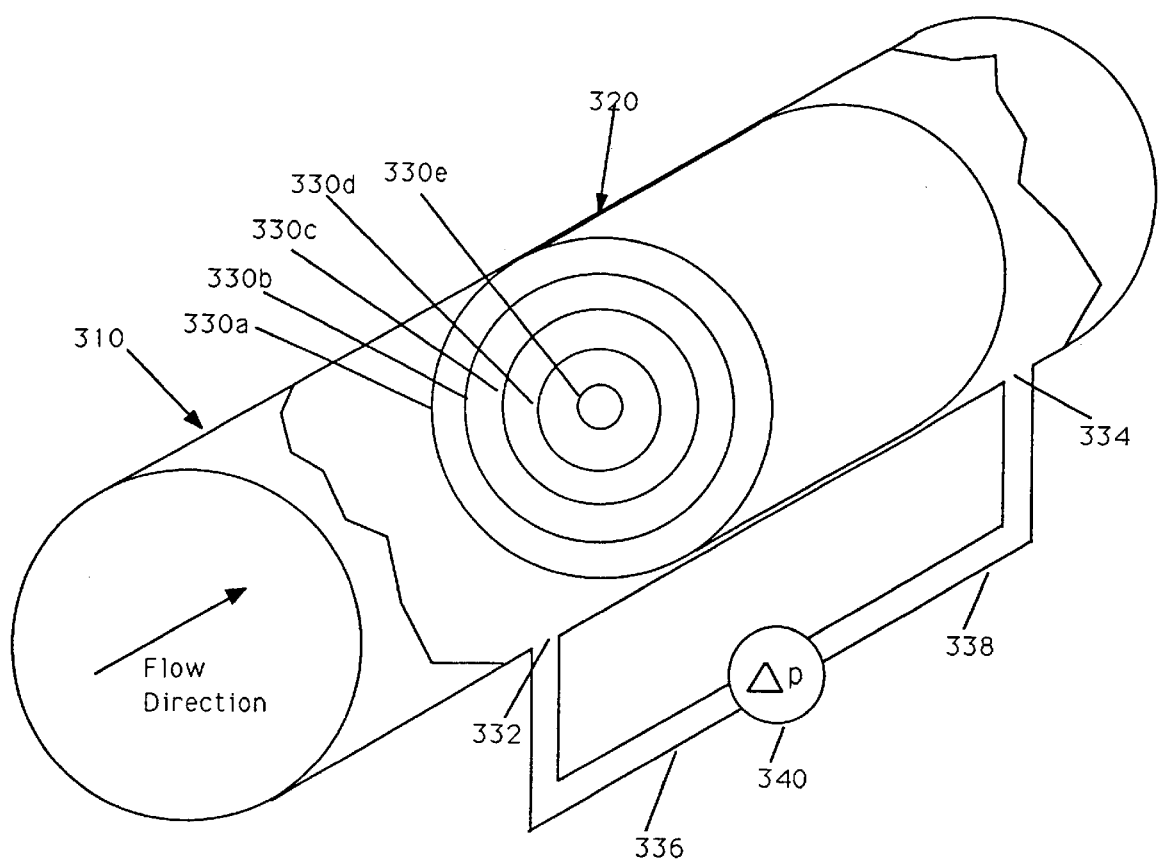

Another geometry is that of a series of concentric tubes resembling a "bull's-eye" target. There is shown in FIG. 5b a duct 310 in which is placed a flow resistance element 320. Flow resistance element 320 which comprises a plurality of circular cylindrical tubes 330 of successively larger sizes, with each tube 330 being placed concentrically and coaxially with respect to the others. Preferably the increment of diameter change between successive tubes is a constant. Just as in previous illustrations, for clarity of illustration, the number of circles shown is relatively small but a larger number would be preferable. This geometry provides annuli which are fluid mechanically in parallel with each other. For strictly laminar fully developed flow, it can be shown that the solution for an annular geometry (given in White) reduces to the parallel plate solution when the radii of the two boundaries of the annulus only differ by an amount which is small compared to their values. For the present flow situation, the same conclusion probably also holds true, i.e., in the limit of many circles, this flow characteristics of geometry are probably approximately those for parallel plates.

Figure 5C:
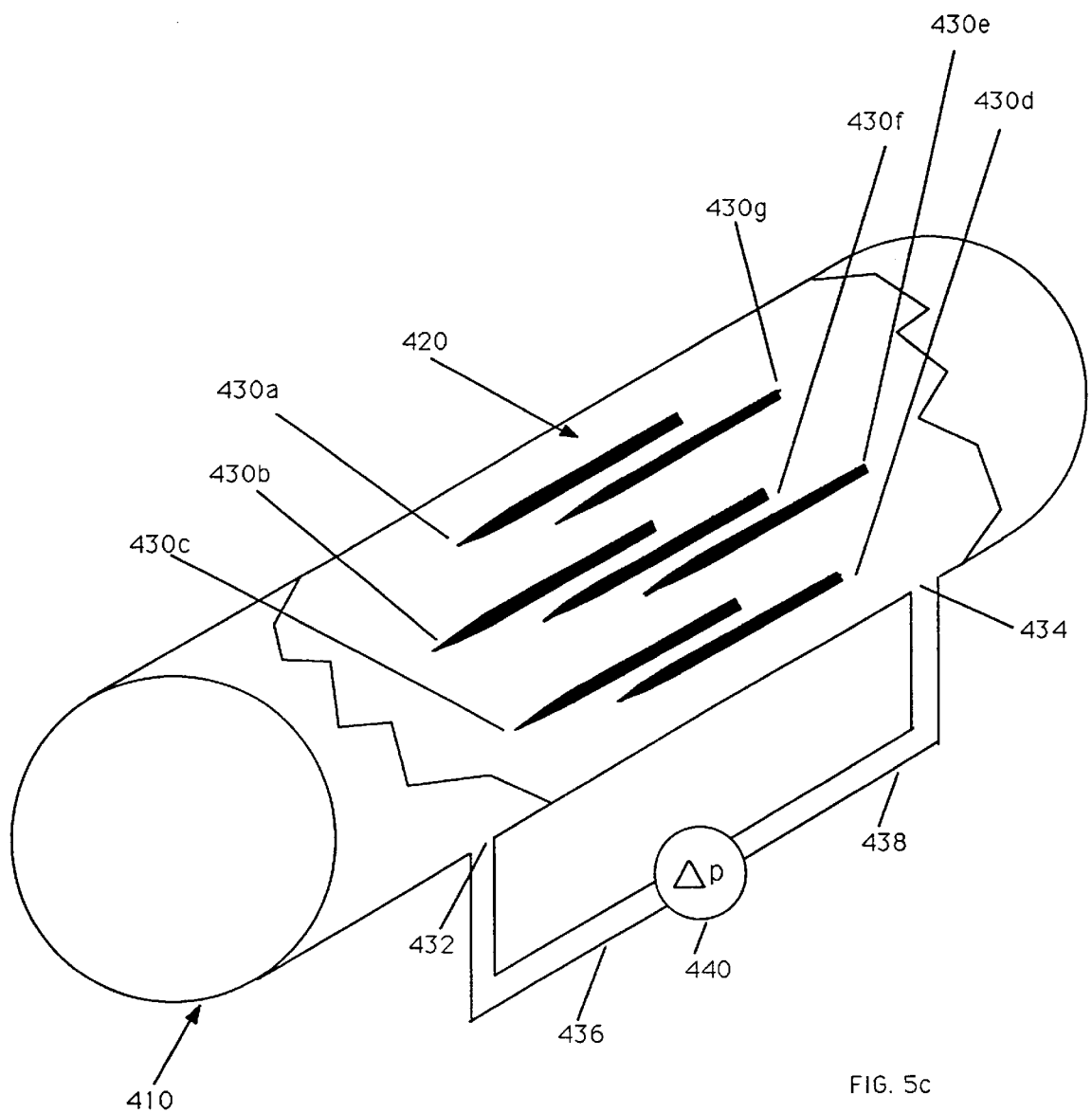

Yet another possible geometry is that of needles pointing upstream, shown in FIG. 5c. There is shown a duct 410 in which is located a flow resistance element 420 comprising needles 430 which are preferably supported structurally at a downstream location and are pointing upstream. Just as with other geometries, the needle geometry also presents a surface which is parallel to the direction of flow, and just as with tubes the geometry of flow around an individual needle is axisymmetric. However, the growing boundary layer is external to the needle. The surface defined by the edge of the boundary layer becomes larger as the boundary layer thickens, in contrast to the axisymmetric situation inside a circular tube where the boundary layer is internal and the surface defined by the edge of the boundary layer constricts as the boundary layer thickens. For clarity of illustration, only seven needles are shown, but more would be preferable. Supporting structure to connect the needles to the walls of the duct would also be needed but, for clarity of illustration, is not shown.

In all of these geometries, the common feature is that the surfaces or components making up the obstruction have the overwhelming majority of their surfaces in an orientation which is parallel to the principal direction of flow (the principal direction of flow both upstream of and during the flow element). The flow element does not require any substantial change of direction of the flow as the flow goes through it. The individual flow passageways are of essentially constant cross-sectional area, i.e., not tapered. The measured pressure drop is pressure drop caused by fluid interaction with those surfaces mainly in shear. Regions of separated flow are minimized by design.

Embodiment 3

So far, with the exception of the background information given about venturis, the pressure difference being discussed has always referred to the pressure drop across the flow element, from a point just upstream of the flow element to a point just downstream of the flow element, with the cross-sectional flow areas being equal at each of those two points. Also, the surfaces making up the flow element have been described as being as thin as possible, so that the cross-sectional flow area within the flow element has been almost equal to the cross-sectional flow area outside the flow element. If in this invention it is acceptable for the pressure measurement locations to be other than the locations shown so far, it is further possible to create an alternate embodiment of this invention, in which the measured pressure difference is not identically equal to the pressure drop across the flow obstruction element. In this embodiment, assuming the pressure taps are static pressure taps, one of the pressure measurement points is downstream of the flow element at a place where the flow cross-sectional area is the full cross-sectional area of the duct, and the other pressure measurement point is upstream of all or most of the flow element but is in a region whose cross-sectional area is smaller by a specifically determined amount than the cross-sectional area of the duct without the flow element. In this case, the pressure measured at that point is modified by the change in static pressure between the two unequal cross-sectional areas. This can be used to provide a further lessening of the slope of the measured pressure vs. flowrate relationship, and a consequent improvement in the turndown ratio.

Minimizing the magnitude of the measured pressure difference at the high end flowrate is important to maintain the structural integrity of the diaphragm or similar component of the differential pressure measuring device, or to avoid exposing it to such a high pressure that its calibration might change. In some applications, minimizing the magnitude of the irrecoverable pressure drop across the flow element is important because the irrecoverable pressure drop represents in some sense a loss of power or energy. Whatever irrecoverable pressure drop occurs across the flowmeter is unavailable to be delivered as useful work. For example, in a process plant, the energy lost due to this irrecoverable pressure drop requires pumping power, and over long periods of time the energy consumption may be significant. However, there also may be other applications in which the irrecoverable pressure drop across a flowmeter is not of such concern. For example, where gas is being delivered through a regulator from a high pressure cylinder, a large amount of pressure drop already exists across the regulator and a small additional pressure drop across a flowmeter is of little or no consequence. The work done to create the initial high pressure must be done anyway for convenience of transporting the gas. If the pressure measurement ratio is of great concern and the irrecoverable pressure drop is of not of such great concern, then it is possible to select measurement locations such that the two measured pressures differ in such a way that the measured pressure difference has a gentler dependence on flowrate than what has been described so far for the irrecoverable pressure drop. Basically, this can be achieved if the measured pressure difference is reduced compared to the irrecoverable (total) pressure difference by some offset amount, and if that offset amount increases with flowrate more rapidly than does the irrecoverable (total) pressure difference. There is readily available a quantity which varies with exactly the second power of flowrate, namely the difference in static pressure between flows of different cross-sectional area, which is the principle used in the venturi. In the venturi, this principle is used to such an extent that the static pressure at the throat of the venturi is by far the smallest static pressure anywhere in the vicinity of the flowmeter. In this embodiment, the venturi principle is simply used to adjust the measured pressure difference by an amount which is modest and which is significant mostly at the high end of the flowrate range.

Figure 6A:
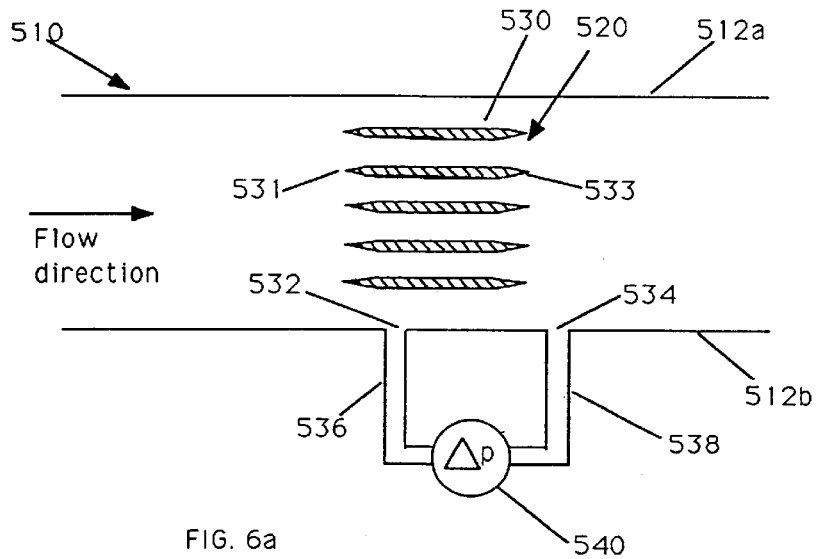
FIGS. 6a and 6b show an embodiment in which the placement of the static pressure taps is such as to produce a further flattening of the pressure drop vs. flowrate relationship.
Figure 6B:
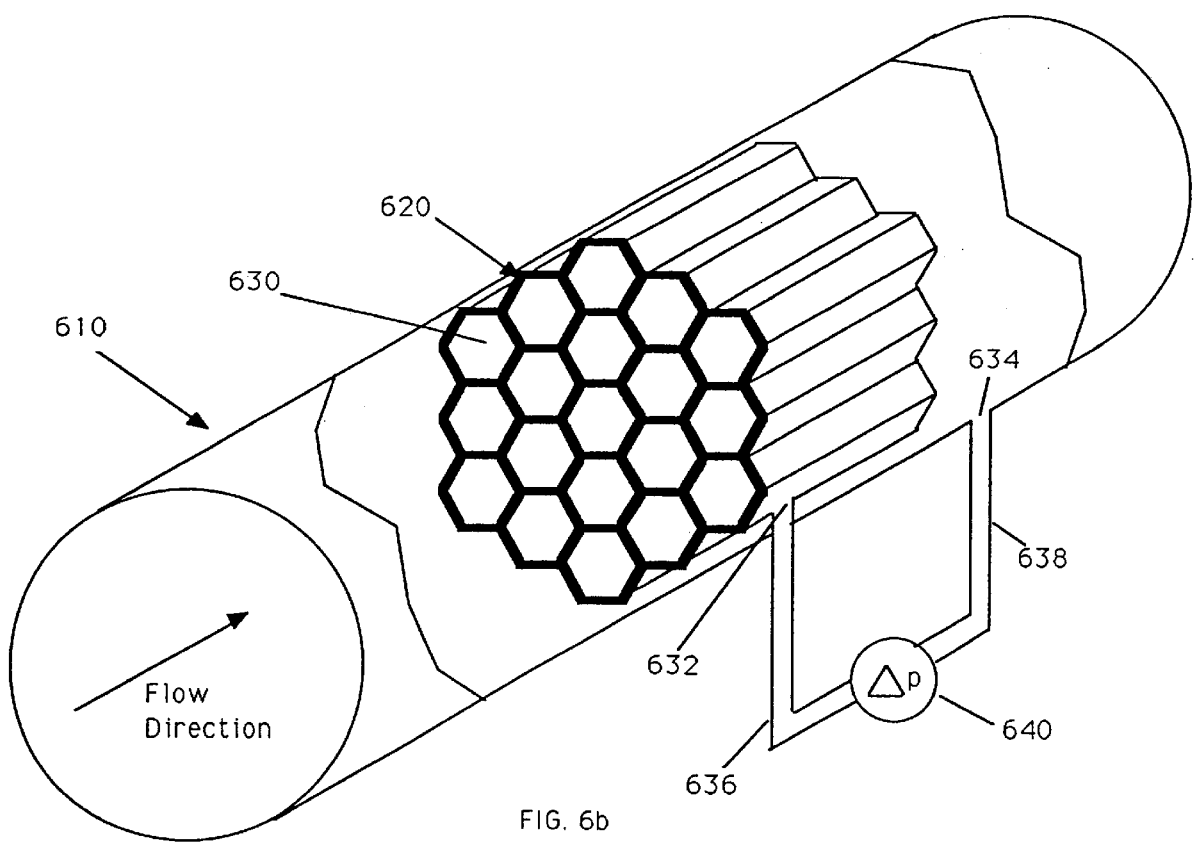

Accordingly, this embodiment is shown in FIG. 6a and 6b. Again, numbering of parts is by analogy to FIG. 1 and FIG. 3, with increments of multiples of 100. FIG. 6a differs from FIG. 1a in the placement of the pressure taps and in the open area fraction of the flow resistance element. For clarity, FIG. 6a is shown as a side view. In FIG. 6a, the thickness of the plates 530 is visible on the drawing and this is somewhat realistic, in contrast with FIG. 1a and FIG. 1b, where the plates were intended to be as thin as possible and were drawn as a single line. This embodiment comprises a duct 510 having sides 512a, 512b, 512c and 512d inside which is placed a flow resistance element 520 comprising parallel plates 530. Tapered leading edges 531 and tapered trailing edges 533 are shown. Disposed in wall 512, such as wall 512c, are static pressure taps 532 and 534 which are connected by conduits 536 and 538 respectively to differential pressure measuring device 540. In this embodiment the measured pressure difference is taken using a more downstream pressure tap 534 and a more upstream pressure tap 532, with the more downstream pressure tap 534 being slightly downstream of the flow resistance element 520 at a place where the full cross-sectional area of duct 510 is available to the flow, and the more upstream pressure tap 532 being at a slightly reduced flow cross-sectional area between the more upstream edge of plate 530 and the more downstream edge of plate 530 preferably closer to the more upstream edge. In this way, measured deltap (pressure difference) in FIG. 6a equals overall deltap as measured in FIG. 1, minus an adjustment due the change in the position of the more upstream tap from its location in FIG. 1 to its location in FIG. 6a. Similarly, FIG. 6b shows this effect with a flow element made of honeycomb. In FIG. 6b the cross-section of the honeycomb 630 is drawn with a heavy line to show that it has a greater thickness than in FIG. 3.

In embodiment 1 the thickness of the plates 30 was preferably the minimum practical thickness, so contouring of the leading and trailing edges was not so important. In this embodiment the thickness of the plates is larger than the minimum practical thickness because the thickness is chosen based on the magnitude of the adjustment of the pressure reading. Therefore, in this embodiment, it may be desirable to incorporate some form of contouring or streamlining of the leading edges 531 and/or trailing edges 533 of plates 530, as was shown in FIG. 1c. The reduction in cross-sectional flow area due to the finite thickness of the plates is not so large, and the transition is preferably very gradual, so that irrecoverable pressure drop from diffuser-type losses (due to separation of flow) should not be significant.

The adjustment due the change in the position of the more upstream pressure tap has not been measured experimentally, but is calculable as the difference in static pressure because of the change in velocity or cross-sectional flow area due to the space occupied by the honeycomb or flow resistance element itself.

The location of pressure tap 532 has been shown as being near the upstream end of the flow resistance element so that there is not a significant amount of flow resistance between its location and the location of pressure tap 32 in FIG. 1. Thus, the main cause of pressure difference between those two points is the change in flow area or velocity. Typically, the space occupied by the solid material of the flow resistance element might only be 5% to 20% of the overall duct flow area, so the area change or velocity change is not nearly as large as for a typical venturi. Thus, we neglect any possible diffuser-type pressure losses associated with the change of area, because very gradual contouring is possible and because the fractional change of area is not very large. Nevertheless, the area change is sufficient to cause a flattening of the relationship of flowrate vs. measured pressure difference.

If at the high end of the flowrate the adjustment caused by this repositioning is moderate, say several tens of percent of the reading, then at the low end the adjustment should be much less, say several percent as a fraction of the reading. This is because, using a factor of 100 in flowrate as an example, the magnitude of the reading would scale downward by a factor of approximately 500 according to the data presented previously, but the magnitude of the adjustment would scale downward by a factor of 10,000. Thus, if the adjustment as a fraction of the reading is x at the high end, then at the low end the adjustment as a fraction of the reading would be x*500/10,000 or only x/20.

FIG. 7 shows a plot of predicted pressure difference according to this embodiment. This is not itself directly measured data. Rather, it is the data of FIG. 4a, which is measured data which has been smoothed, and then that data has been adjusted mathematically for a change of area using the well-accepted Bernoulli principle, to show what the pressure difference would be using the measurement locations of FIG. 6 instead of the measurement location of FIG. 1. The data used to create FIG. 7 were taken with a honeycomb geometry, so the graph in FIG. 7 corresponds to FIG. 6b. The area ratio which has been used in making this adjustment is an open area fraction of 0.87 for both the 24 mm long honeycomb and the 12 mm long honeycomb. It can be seen that for a flowrate ratio of 100, the ratio of the pressure difference at the high end to the pressure difference at the low end is approximately 200. This is even smaller than the ratio of approximately 500 shown in FIG. 4a. This ratio depends of course on the open area fraction and would be different for a different open area fraction. It can be appreciated that if the adjustment is too large it can adjust the high end of the curve to an extent that the curve becomes extremely flat, which is bad for measuring because there will not be much sensitivity in that portion of the curve. In fact, the adjustment could even be so great that the curve turns around and a single measured pressure difference could be associated with two different flowrates, a situation which obviously must be avoided. In any event, this relationship would have to be taken into account in the overall flowmeter system, for example by being programmed into software which interprets the pressure signal. For the adjusted data in FIG. 7, the exponent for the average curve defined by the two endpoints, giving a pressure ratio of 200 for a flow ratio of 100, is 1.15. This result can be used with the derivation previously presented to calculate how much improvement in the flow turndown ratio is to be expected for a given pressure measurability ratio. For a pressure measurability ratio of 100, the improvement factor is 5.5.

This modification of the placement of the pressure taps is shown as a modification of the parallel geometry used in FIG. 1a. However, it is to be understood that this modification applies equally well to and could be used with any of the other geometries disclosed herein. It would also be possible to achieve this same effect using a honeycomb or flow element whose walls were arbitrarily thin, as in Embodiment 1 or 2, if a slight venturi (very gradually contoured so as to avoid separation) were placed upstream of the flow element and the upstream static pressure tap 532 were placed at the throat of the venturi.

Embodiment 4

Figure 8A:
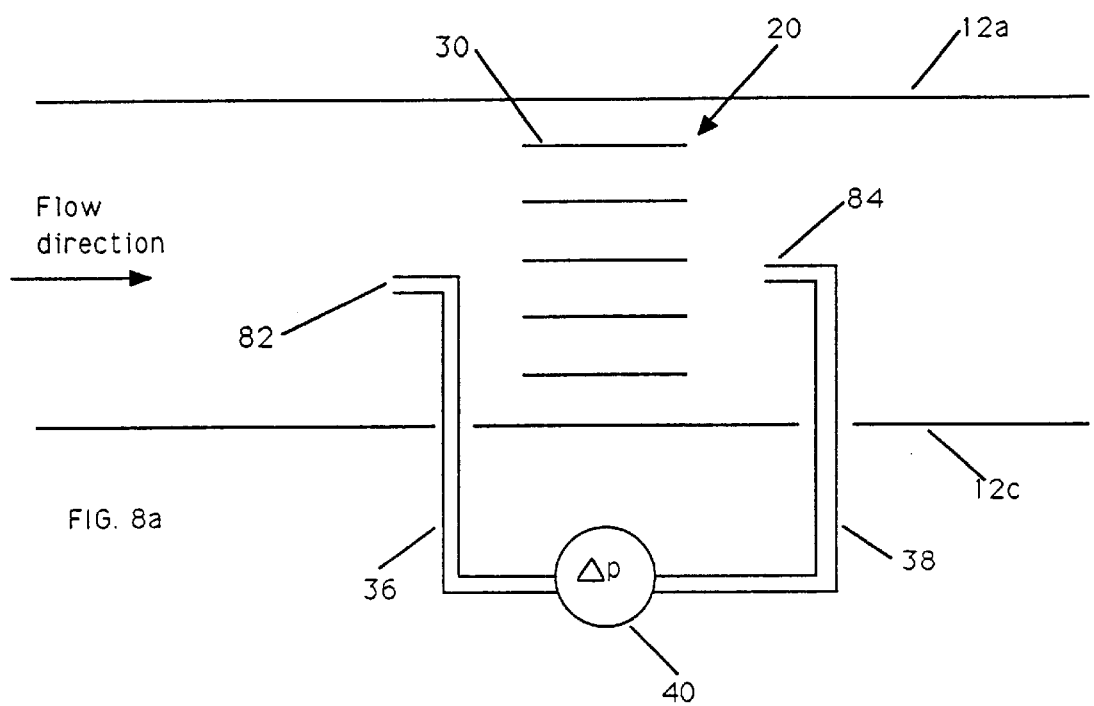
FIGS. 8a and 8b show variations of the present invention involving a pitot type pressure probe instead of a static pressure probe.
Figure 8B:
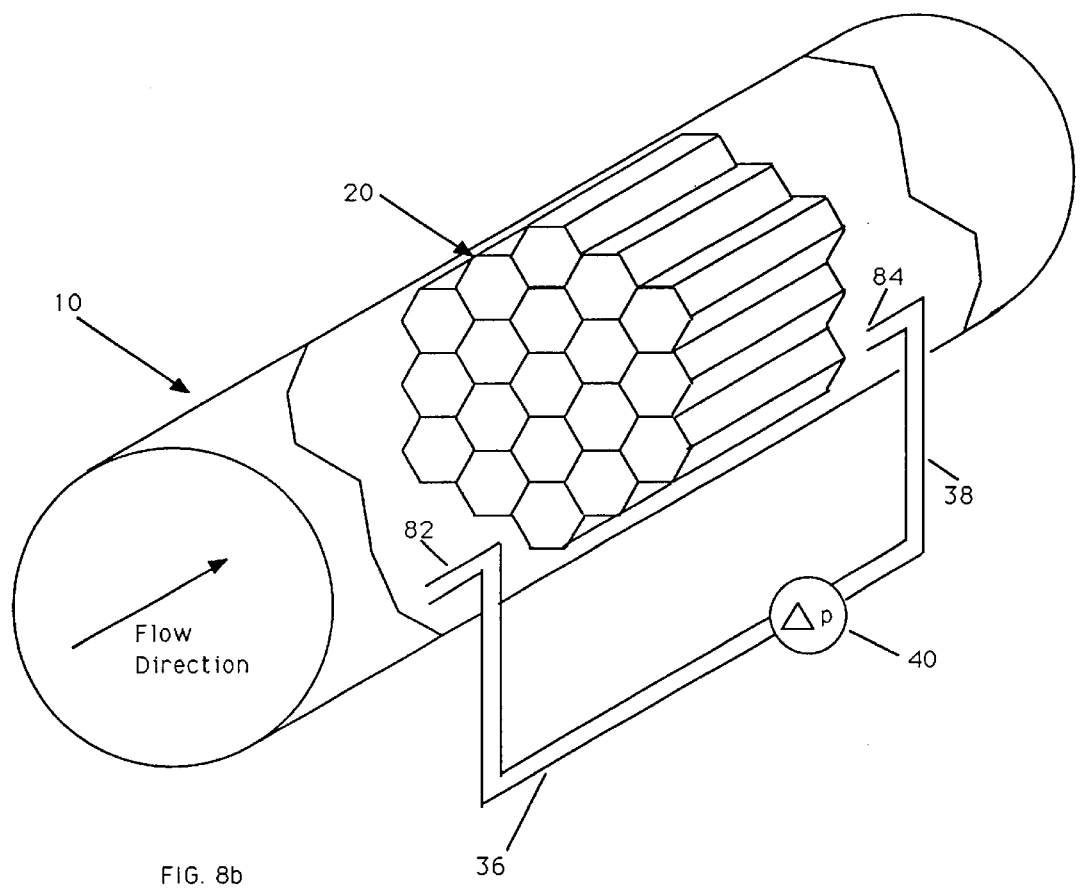
Figure 9:
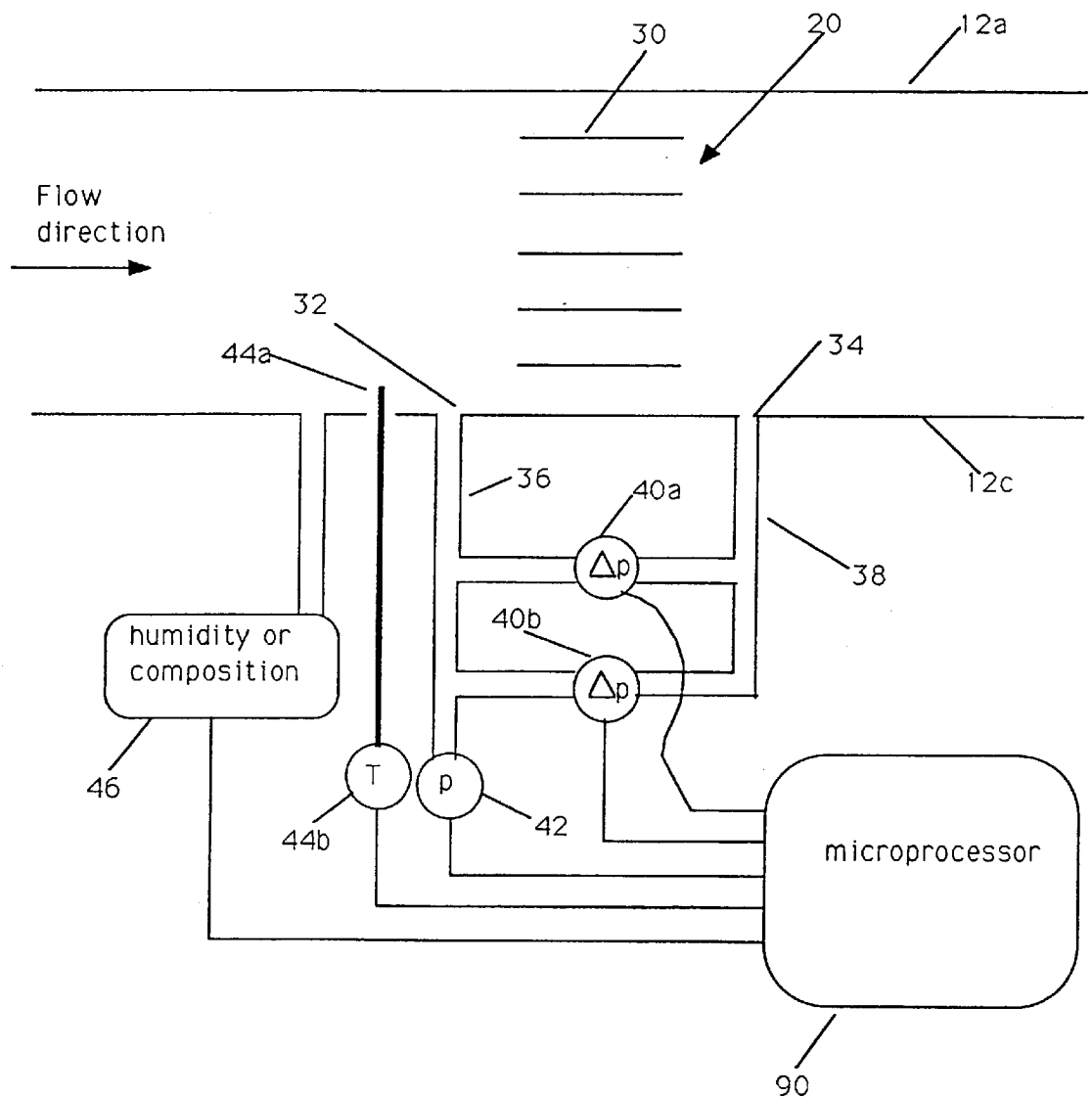

So far, all of the pressure measurements have been shown as being taken by static pressure taps. It is also possible to take pressure readings using pitot tubes as shown in FIG. 8a and FIG. 8b. A pitot tube is an open-ended tube whose open end points essentially directly at the oncoming flow. FIG. 8a is a side view of a flat plate geometry and corresponds to FIG. 1b, with the only difference being the use of pitot tubes 82 and 84 instead of static pressure taps. FIG. 8b is a perspective view of a honeycomb corresponding to FIG. 3 using pitot tubes. If pitot tube 82 is placed so that its tip is slightly upstream of flow element 20 and pitot tube 84 is placed so that its tip is slightly downstream of flow element 20, then the difference between those two readings should be essentially the same as the difference between the two readings from static pressure taps placed as in FIG. 1a. If the flow resistance element were a honeycomb, the data should be essentially identical to the data presented in FIG. 4. This equivalence depends in part on the flow cross-sectional areas at those two places being equal, as has been assumed all along.

In addition to all of the above, it is known that both pitot probes and static pressure probes have a reading which is dependent on angle, as for example if a pitot probe is not pointing directly into the flow or a static pressure probe is not perfectly parallel to the flow. Thus, using angle, it would be possible to obtain the effect of Embodiment 3 even if both pressure readings were taken at locations having equal cross-sectional area. It is simply necessary to arrange that the reading at one location have a larger component of the impact pressure or velocity head (0.5*density*velocity^2) than the reading at the other location. That would accomplish essentially what has been accomplished in the examples so far in Embodiment 3 (in FIG. 6), namely to adjust the overall pressure drop by a fraction of the velocity head, In embodiment 3 the adjustment was accomplished by means of area change, but it could also be accomplished by means of the angle of the probe.

The flowmeter described herein (in any of its embodiments) may further comprise a filter upstream of the actual flow element, such that the only particles which are able to pass through the filter are substantially smaller than the honeycomb cell size. It can be realized that if the fluid stream contains foreign matter (solid particles), over a long period of time the foreign matter particles could possibly become lodged at the flow resistance element and thereby reduce its open flow area. This would change its calibration (the relationship between flowrate and pressure drop) and hence is undesirable.

It can be appreciated that at least some of the flow resistance elements disclosed herein can be made by plastic molding. Streamlining of leading and trailing edges is especially possible if the parts are made by plastic molding.

The data presented here have been taken using air as the flowing fluid. However, it should be appreciated that the flowmeter described herein could be used equally well with gases other than air, with water, with liquids other than water, and in general with any fluid.

It can be appreciated that since the transition as indicated by the value of the exponent is so gradual, the present invention can be used over a wide range of Reynolds numbers. In the data presented here, the range between the low end and the high end of the flowmeter was approximately 100 and the range between the low end and the high end of pressure difference was approximately 500. Two separate pressure transducers were used and the appropriate transducer was manually chosen, so that the low range pressure transducer was never exposed to the largest pressure differences. Neither pressure transducer was a silicon micromachined pressure transducer. Of course, in actual use it is not possible to know ahead of time what pressure difference to expect and to manually switch between pressure transducers so as to protect the lower range transducer. However, in the experimental data presented here, the higher range pressure transducer was only used for about a factor of 5 at the high end of the range of pressure, and the low range pressure transducer was used for the lower factor of 100 or so in pressure difference. If the low range pressure transducer had been a silicon micromachined pressure transducer, it could probably have been exposed to an overpressure of a factor of 5 or nearly 5 without damage or change of calibration. Thus, it can be estimated that a flow turndown ratio of about 100 is achievable. For the data presented here, the Reynolds number at the low end flowrate is within the range of Reynolds number limitation traditionally prescribed for a Laminar Flow Element. This helps to keep the exponent and hence the overall ratio of pressure differences small, although this is not absolutely necessary. For the data presented here, the Reynolds number at the high end flowrate is higher than the Reynolds number limitation traditionally prescribed for a Laminar Flow Element. In defining this invention, the Reynolds number at the low end flowrate can be within the laminar range but it does not have to be. The Reynolds number at the high end flowrate is larger than the limiting Reynolds number for laminar flow, which is referred to for known Laminar Flow Elements as being a Reynolds number of 300 or 1000 to 2000. The invention is probably most useful if the Reynolds number at the high end flowrate is less than 100,000 (1.E5), because the slope will not have fully reached the limiting slope for infinitely large Reynolds number. However, in general, there need be no upper maximum value of Reynolds number. Again, for this purpose the Reynolds number is defined as the fluid density times the fluid velocity times the hydraulic diameter or characteristic dimension perpendicular to the flow of an individual passageway, divided by the fluid viscosity. It can be estimated that the range of L/D (length of flow element along the principal flow direction, divided by the effective or hydraulic diameter of an individual passageway) in which the present invention would most likely be used is from 2 to 50. Even this upper limit of L/D=50 is still less than the criterion frequently used to obtain a situation in which fully developed flow is dominant over entrance effects.

If the fluid whose flowrate is being measured is a gas, the measured pressure drop across the flow element as described so far may not be sufficient information to uniquely determine the flowrate. This is because the density of any gas varies as a function of the temperature and the absolute pressure. In actual use the temperature may vary due to weather or other reasons, and the absolute pressure may vary due to elevation, weather (to a lesser extent), or other reasons. For example, going from sea level to high mountain elevations can cause the density to vary by several tens of percent, and the same can be caused by variation between extreme summer temperatures and extreme winter temperatures. For accurate flowmetering of gases, and depending on the amount of variation in these conditions expected in a particular application, it may well be necessary to take into account both of these factors. This can be done as is shown in FIG. 10. In addition to the parts described in FIG. 1a, FIG. 10 comprises an absolute pressure sensor 42 and a temperature sensor 44a which may be a thermocouple or thermistor or similar device with associated processing device 44b. It may even comprise a sensor 46 for measuring humidity or composition of the gas. FIG. 10 shows two differential pressure transducers 40a and 40b of different ranges as discussed previously. FIG. 10 also shows a microprocessor 90 or similar device. Microprocessor 90 receives signals from differential pressure transducers 40a and 40b, absolute pressure sensor 42, temperature sensor 44a and its associated processing device 44b, and (if present) sensor 46. If there are two pressure transducers 40a and 40b of different ranges with the lower range transducer capable of withstanding overpressure, microprocessor 90 decides which of them should be read or if perhaps the signals from both of them should be used. Microprocessor 90 then uses the signals from all of these sensors to calculate flowrate by means of programmed formulas or algorithms or a lookup table, as is known in the art. For example, the relationship between pressure drop and flowrate at nominal conditions could be programmed, and then adjustments could be made based on departures from nominal conditions in as many of the variables as sensors are provided for. The calculations could be based on empirical data or theoretical formulas or a combination of both. A further detail pertains to the case of humid air. If the fluid whose flowrate is being measured is air with the possibility of humidity, even the temperature and absolute pressure (in addition to the differential pressure) do not suffice to completely determine the mass flowrate. The humidity also affects the density and hence the accurate calculation of the mass flowrate. Water vapor is less dense than air because it has a lower molecular weight. For example, at a temperature of 100 F., fully humid air contains 6.5% water vapor (by volume), and its density is 2.5% less than the density of dry air. At higher temperatures the difference increases rapidly. Furthermore, it is possible that the mass flowrate is being measured at the intake of a combustion process for the purpose of proportioning air and fuel. In this case, the overall mass flowrate may not be the quantity of greatest interest. Instead, the quantity of greatest interest may be the mass flowrate of oxygen. The oxygen fraction in dry air is 21% but in humid air at 100 F., the fraction is 19.6%, and the difference increases rapidly at still warmer temperatures. Thus, if humidity is measured, this can be used to adjust the reported quantity so that the reported quantity is essentially the mass flowrate of oxygen. In other situations, it is possible that the gas species being passed through the flowmeter could vary. In this event it might be necessary for the flowmeter to switch from one lookup table or algorithm to another depending on the species. This could be made to happen either manually by means of a switch or automatically based on the input from the composition sensor 46. The same is true for liquids. A lookup table or algorithm could be provided for water and others could be provided for other liquids, with provision to switch from one to another either manually or based-on information from composition sensor 46. The flowmeter could even be made to work with multi-phase fluids (e.g. mists) if appropriate calibration data is taken and appropriate lookup tables or algorithms are built into microprocessor 90.

Although several embodiments of the invention have been disclosed and described in detail herein, it should be understood that this invention is in no sense limited thereby and its scope is to be determined by that of the appended claims.

I claim:

1. A flowmeter for measuring the flowrate of a fluid inside a flow channel having a cross-section and a principal flow direction, wherein the flowmeter is operable between a lower-limit flowrate and an upper-limit flowrate, comprising a flow resistance element located inside the flow channel across substantially the entire cross-section of the flow channel, and a differential pressure sensor which measures the difference between the pressure at a first location and the pressure at a second location downstream of the first location, and wherein the flow resistance element has an upstream end and a downstream end and wherein the pressure at the first location is measured by a static pressure tap inside the flow resistance element preferably close to the upstream end of the flow resistance element and the pressure at the second location is measured by a static pressure tap downstream of the flow resistance element, and wherein the flow resistance element comprises a plurality of objects each having a side surface which is substantially parallel to the principal flow direction and having a frontal surface which is not substantially parallel to the principal flow direction, the side surface having a side surface area and the frontal surface having a frontal surface area, wherein the side surface area is much larger than the frontal surface area, and wherein at the upper-limit flowrate at the downstream end of the flow resistance element, a first side surface of said plurality of objects has a first boundary layer having a first boundary layer thickness and a second side surface of said plurality of objects which faces the first side surface has a second boundary layer having a second-boundary-layer thickness, and the first side surface is separated from the second side surface by a distance, and the sum of the first boundary layer thickness and the second-boundary-layer thickness is less than the distance between the first side surface and the second side surface, and wherein a characteristic dimension is the distance between the first side surface and the second side surface, and the flow resistance element has a length from the upstream end to the downstream end, and wherein the ratio of length to characteristic dimension is between about 2 and about 50, and wherein the fluid has a velocity at the upper-limit flowrate and a density and a viscosity and wherein the thickness of each boundary layer is given by the length times 5 divided by the square root of (the density times the velocity times the length divided by the viscosity).

2. The flowmeter of claim 1, wherein the flow resistance element is an array of substantially identical hexagonal cells.

3. The flowmeter of claim 2, wherein the flow resistance element has a characteristic dimension which is the height of the hexagonal cell, and the flow resistance element has a length from its upstream end to its downstream end, and wherein the ratio of length to characteristic dimension ranges from about 2 to about 50.

4. The flowmeter of claim 1, wherein the flow resistance element is an array of substantially identical tubes.

5. The flowmeter of claim 1, wherein the flow resistance element has a leading edge facing upstream and a trailing edge facing downstream and the leading and trailing edges are streamlined.

6. The flowmeter of claim 1, wherein the flow resistance element has a frontal solid area and the frontal solid area of the flow resistance element is chosen so as to adjust the magnitude of pressure difference between the upstream tap and the downstream tap especially at large flowrates, whereby the dependence of measured pressure difference on flowrate is reduced.

7. The flowmeter of claim 6, wherein the frontal solid area occupies between approximately 5% and approximately 20% of the cross-section of the flow channel.

8. The flowmeter of claim 1, wherein the differential pressure sensor comprises at least a lower-range differential pressure transducer and a higher-range differential pressure transducer, and wherein the lower-range differential pressure transducer can withstand without damage or change of calibration the pressure difference which it experiences at the upper-limit flowrate.

9. The flowmeter of claim 1, further comprising an absolute pressure sensor having an absolute pressure output and a temperature sensor having a temperature output, wherein the differential pressure sensor has a differential pressure output, wherein the absolute pressure output and the temperature output and the differential pressure output are all transmitted to a microprocessor, which calculates the flowrate.

10. The flowmeter of claim 9, further comprising a humidity sensor or a composition sensor having a humidity or composition output, which output is also transmitted to the microprocessor.

11. The flowmeter of claim 10, wherein the fluid is air of arbitrary humidity, and the microprocessor reports a calculated flowrate, and the calculated flowrate which the microprocessor reports is the flowrate of oxygen.

12. The flowmeter of claim 1, wherein the fluid has a density and a viscosity, and wherein at the upper-limit flowrate the fluid has a velocity upstream of the flow resistance element, and wherein the density of the fluid times the velocity of the fluid upstream of the flow resistance element, times the distance, in a direction perpendicular to the principal flow direction, between side surfaces of objects making up the flow resistance element which face each other, divided by the viscosity of the fluid, is greater than 2000.

13. The flowmeter of claim 12, wherein at the upper-limit flowrate the density of the fluid times the velocity of the fluid upstream of the flow resistance element, times the distance, in a direction perpendicular to the principal flow direction, between side surfaces of objects making up the flow resistance element which face each other, divided by the viscosity of the fluid, is less than about 100,000.

14. The flowmeter of claim 1, wherein the flow resistance element is an array of parallel planes.

15. The flowmeter of claim 1, wherein the flow resistance element is an array of circular concentric tubes.

16. The flowmeter of claim 1, wherein the flow resistance element is an array of solid pointed cylindrical elements.

17. The flowmeter of claim 1, wherein the ratio of length to characteristic dimension is less than 25.

18. A flowmeter for measuring the flowrate of a fluid inside a flow channel having a cross-section and a principal flow direction, comprising a flow resistance element located inside the flow channel across substantially the entire cross-section of the flow channel, and a differential pressure sensor which measures the difference between the pressure at a first location and the pressure at a second location downstream of the first location, and wherein the flow resistance element has an upstream end and a downstream end and wherein the pressure at the first location is measured by a static pressure tap inside the flow resistance element preferably close to the upstream end of the flow resistance element and the pressure at the second location is measured by a static pressure tap downstream of the flow resistance element, and wherein the flow resistance element comprises a plurality of objects each having a side surface which is substantially parallel to the principal flow direction and a frontal surface which is not substantially parallel to the principal flow direction, the side surface having a side surface area and the frontal surface having a frontal surface area, wherein the side surface area is much larger than the frontal surface area, and wherein a characteristic dimension is the distance between a first side surface and a second side surface which faces the first side surface, and the flow resistance element has an upstream end and a downstream end and a length from the upstream end to the downstream end, and wherein the ratio of length to characteristic dimension is greater than about 2 and less than 25.

19. The flowmeter of claim 18, wherein the fluid has a density and a viscosity, and wherein the flowmeter is operable between a lower-limit flowrate and an upper-limit flowrate, and wherein at the upper-limit flowrate the fluid has a velocity upstream of the flow resistance element, and wherein the density of the fluid times the velocity of the fluid upstream of the flow resistance element, times the characteristic dimension, divided by the viscosity of the fluid, is greater than 2000.

20. A method of measuring flowrate of a fluid flowing inside a channel having a principal flow direction, comprising:

a) placing inside the flow channel across substantially the entire cross-section of the flow channel the flowmeter of claim 18, b) measuring a pressure difference using the flowmeter; and c) inferring the flowrate through the use of a calibration relation between flowrate and measured pressure difference.

21. The method of claim 20, wherein the flow resistance element is an array of substantially identical hexagonal cells.

22. The method of claim 20, wherein the step of inferring is performed by a microprocessor.

23. The method of claim 22, wherein the microprocessor additionally uses inputs from a temperature sensor or an absolute pressure sensor or a composition sensor or a humidity sensor to infer the flowrate.

24. The method of claim 20, wherein the fluid has a density and a viscosity, and at an upper-limit flowrate the fluid has a velocity upstream of the flow resistance element, and a Reynolds number is defined as the density of the fluid times the velocity of the fluid upstream of the flow resistance element, times the distance, in a direction perpendicular to the principal flow direction, between side surfaces of objects making up the flow resistance element which face each other, divided by the viscosity of the fluid, and wherein the Reynolds number is greater than 2000.

25. The method of claim 20, wherein the ratio of length to characteristic dimension is less than 25.

\* \* \* \* \*